United States Patent
Iwamoto

(10) Patent No.: US 8,110,307 B2
(45) Date of Patent: Feb. 7, 2012

(54) NEGATIVE ELECTRODE FOR LITHIUM SECONDARY BATTERY, METHOD FOR PRODUCING SAME, AND LITHIUM SECONDARY BATTERY COMPRISING SUCH NEGATIVE ELECTRODE FOR LITHIUM SECONDARY BATTERY

(75) Inventor: Kazuya Iwamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 980 days.

(21) Appl. No.: 12/089,046

(22) PCT Filed: Jan. 24, 2007

(86) PCT No.: PCT/JP2007/051064
§ 371 (c)(1),
(2), (4) Date: Apr. 2, 2008

(87) PCT Pub. No.: WO2007/086411
PCT Pub. Date: Aug. 2, 2007

(65) Prior Publication Data
US 2009/0117472 A1    May 7, 2009

(30) Foreign Application Priority Data
Jan. 25, 2006  (JP) .................. 2006-015896

(51) Int. Cl.
*H01M 4/13* (2010.01)
(52) U.S. Cl. ..................... 429/218.1; 429/246
(58) Field of Classification Search .......... None
See application file for complete search history.

(56) References Cited

U.S. PATENT DOCUMENTS

| | | | |
|---|---|---|---|
| 5,395,711 A | 3/1995 | Tahara et al. | |
| 7,192,673 B1 | 3/2007 | Ikeda et al. | |
| 7,700,235 B2* | 4/2010 | Konishiike et al. | 429/218.1 |
| 2002/0114993 A1 | 8/2002 | Miyaki et al. | |
| 2004/0033419 A1 | 2/2004 | Funabiki | |
| 2004/0142242 A1 | 7/2004 | Kawase et al. | |
| 2004/0241548 A1 | 12/2004 | Nakamoto et al. | |
| 2005/0084758 A1 | 4/2005 | Yamamoto et al. | |
| 2005/0118503 A1 | 6/2005 | Honda et al. | |
| 2006/0099507 A1* | 5/2006 | Kogetsu et al. | 429/218.1 |
| 2007/0059601 A1 | 3/2007 | Natsume et al. | |

FOREIGN PATENT DOCUMENTS
JP    6-325765    11/1994
(Continued)

OTHER PUBLICATIONS

IPDL Machine Translation of JP 2005-085717 printed Jun. 4, 2011.*
Huggins, R., "Lithium alloy negative electrodes formed from convertible oxides", Solid State Ionics 113-115, 1998, pp. 57-67, Elsevier Science B.V.

(Continued)

*Primary Examiner* — Barbara Gilliam
*Assistant Examiner* — Maria J Laios
(74) *Attorney, Agent, or Firm* — McDermott Will & Emery LLP

(57) ABSTRACT

A negative electrode 100 for a lithium secondary battery includes: a current collector 11; a negative-electrode active material body 12 supported by the current collector 11, the negative-electrode active material body 12 having a chemical composition represented as $SiO_x$ ($0.1 \leq x \leq 1.2$); and a covering layer 14 formed on the negative-electrode active material body 12, the covering layer 14 having a chemical composition composed of silicon dioxide. The covering layer 12 has a thickness which is greater than 1 nm and no more than 10 nm.

10 Claims, 15 Drawing Sheets

FOREIGN PATENT DOCUMENTS

| | | |
|---|---|---|
| JP | 2002-83594 | 3/2002 |
| JP | 2004-71542 | 3/2004 |
| JP | 2004-349162 | 12/2004 |
| JP | 2004-349237 | 12/2004 |
| JP | 2005-85717 | 3/2005 |
| JP | 2005-196970 | 7/2005 |
| JP | 2006-107912 | 4/2006 |

OTHER PUBLICATIONS

Yang, J., et al., "SiOx-based anodes for secondary lithium batteries", Solid State Ionics 152-153, 2002, pp. 125-129, Elsevier Science B.V.

Korean Office Action issued in Korean Patent Application No. 10-2008-7013175, dated Jul. 30, 2010.

European Search Report issued in European Patent Application No. 07707311.2, mailed Jun. 19, 2009.

\* cited by examiner (a)

(b)

(a)

(b)

(a)

(b)

(a)

(b)

(c)

US 8,110,307 B2

NEGATIVE ELECTRODE FOR LITHIUM SECONDARY BATTERY, METHOD FOR PRODUCING SAME, AND LITHIUM SECONDARY BATTERY COMPRISING SUCH NEGATIVE ELECTRODE FOR LITHIUM SECONDARY BATTERY

RELATED APPLICATIONS

This application is the U.S. National Phase under 35 U.S.C. §371 of International Application No. PCT/JP2007/051064, filed on Jan. 24, 2007, which in turn claims the benefit of Japanese Patent Application No. JP 2006-015896, filed on Jan. 25, 2006, the disclosures of which applications are incorporated by reference herein.

TECHNICAL FIELD

The present invention relates to a negative electrode for a lithium secondary battery and a method of producing the same, and a lithium secondary battery having a negative electrode for a lithium secondary battery.

BACKGROUND ART

There is a trend for downsizing and enhancement in the performance of mobile information terminals such as PCs (Personal Computers), mobile phones, and PDAs (Personal Digital Assistants), and audio-visual devices such as video-recorders and memory audio players, in which lithium-ion secondary batteries are used.

This has led to the desire for higher capacities in lithium-ion secondary batteries. For achieving high capacity, choices and designs of negative-electrode active materials are under study. As negative-electrode active materials for achieving high capacity, metal lithium is being studied, and aluminum, silicon, tin and the like, which are capable of forming alloys with lithium, are being studied (e.g., Non-Patent Document 1). Among others, silicon has a large theoretical capacity, and there has been a proposal for a lithium-ion secondary battery using silicon as an active material (e.g., Patent Document 1).

However, silicon undergoes large volumetric changes when reacting with lithium ions, thus causing a problem in that repetitive charging and discharging invites a lower current collecting ability, such that sufficient cycle characteristics cannot be obtained.

As a negative-electrode active material for solving this problem, $SiO_x$ (0<x<2) has been proposed (e.g., Patent Document 2). $SiO_x$ has a high capacity, and exhibits stable cycle characteristics. However, there is a problem in that not all of the lithium that was inserted during initial charging is desorbed, thus resulting in a large level of so-called irreversible capacity. In order to solve this problem, it has been proposed to form $SiO_x$ into thin films via vacuum evaporation or sputtering (e.g., Patent Document 3).

[Patent Document 1] Japanese Laid-Open Patent Publication No. 2002-83594
[Patent Document 2] Japanese Laid-Open Patent Publication No. 6-325765
[Patent Document 3] Japanese Laid-Open Patent Publication No. 2004-349237
[Non-Patent Document 1] Solid State Ionics, 113-115, 57, (1998)

DISCLOSURE OF INVENTION

Problems to be Solved by the Invention

In the construction proposed in Patent Document 3, the surface of the negative electrode is $SiO_x$. Therefore, decomposition of the electrolytic solution occurs through contact between $SiO_x$ and the electrolytic solution, thus resulting in the problem of a high-resistance coating being formed on the surface of the negative electrode. If such a coating is formed on the surface of the negative electrode, polarization becomes large, so that the charge-discharge capacity will decrease and the charge-discharge cycle characteristics will be deteriorated.

The present invention was made in order to solve the aforementioned problem, and an objective thereof is to suppress decomposition of an electrolytic solution caused by a negative-electrode active material, thus improving the charge-discharge cycle characteristics of a lithium secondary battery.

Means for Solving the Problems

In order to solve the aforementioned conventional problems, a negative electrode for a lithium-ion secondary battery according to the present invention comprises: a current collector; a negative-electrode active material body supported by the current collector, the negative-electrode active material body having a chemical composition represented as $SiO_x$ (0.1≦x≦1.2); and a covering layer formed on the negative-electrode active material body, the covering layer being composed of silicon dioxide. The covering layer has a thickness which is greater than 1 nm and no more than 10 nm.

In accordance with the above construction, a covering layer composed of silicon dioxide is formed on the surface of the negative-electrode active material body, and thus the decomposition reaction of an electrolytic solution occurring when the electrolytic solution comes directly in contact with the negative-electrode active material body can be suppressed. Therefore, any high-resistance coating associated with the decomposition reaction of the electrolytic solution becomes unlikely to be formed on the surface of the negative electrode. As a result, polarization occurring due to such a coating can be minimized, and the charge-discharge cycle characteristics can be improved.

Moreover, since the covering layer has a thickness which is greater than 1 nm and no more than 10 nm, the decomposition reaction of the electrolytic solution can be suppressed while minimizing an increase in polarization due to the provision of the covering layer.

Effects of the Invention

According to the present invention, in a negative electrode for a lithium-ion secondary battery, decomposition reaction of an electrolytic solution caused by a negative-electrode active material body can be suppressed, while ensuring a high charge-discharge capacity. As a result, a lithium secondary battery having excellent charge-discharge cycle characteristics can be provided.

DESCRIPTION OF REFERENCE NUMERALS

| | |
|---|---|
| 100, 31 | negative electrode |
| 11 | current collector |
| 12 | negative-electrode active material body |
| 13 | expansion buffer layer |
| 14 | covering layer |
| 15 | negative-electrode active material layer |
| 21 | evacuation pump |
| 22 | vacuum chamber |
| 23 | carbon crucible |
| 24 | holder |
| 30 | coin battery |
| 32 | positive electrode |
| 33 | separator |
| 34 | spacer |
| 35 | sealing plate |
| 36 | case |
| 50 | vapor deposition apparatus |
| 51 | current collector |
| 52 | nozzle |
| 53 | tubing |
| 54 | stage |
| 55 | target |
| 56 | chamber |
| 57 | pivot axis |

BEST MODE FOR CARRYING OUT THE INVENTION

Hereinafter, with reference to the drawings, embodiments of a negative electrode for a lithium secondary battery according to the present invention will be described.

Figure 1:
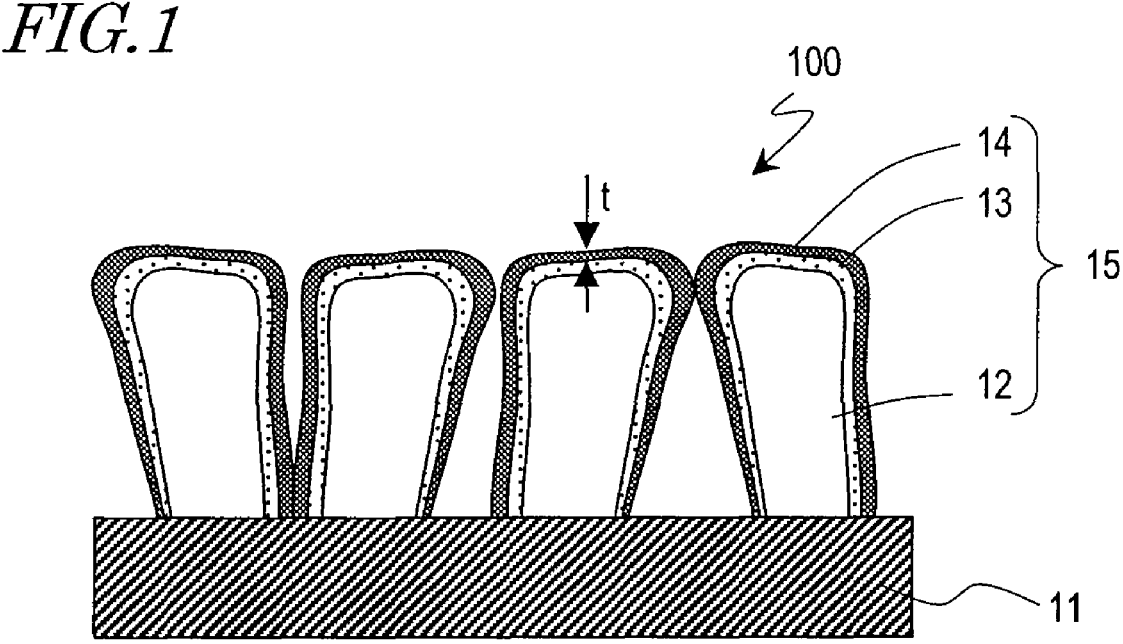
FIG. 1 A schematic cross-sectional view of a negative electrode according to Embodiment 1 of the present invention.

First, FIG. 1 is referred to. FIG. 1 is a schematic cross-sectional view of a negative electrode, for a lithium-ion secondary battery, of the present embodiment (hereinafter also referred to as a "negative electrode").

The negative electrode 100 includes a current collector 11 and a negative-electrode active material layer 15 formed on the surface of the current collector 11. The negative-electrode active material layer 15 includes a negative-electrode active material body 12, a covering layer 14 composed of silicon dioxide which is formed on the surface of the negative-electrode active material body 12, and an expansion buffer layer 13 provided between the negative-electrode active material body 12 and the covering layer 14. The negative-electrode active material body 12 has a chemical composition represented as $SiO_x$ ($0.1 \leq x \leq 1.2$). Moreover, the expansion buffer layer 13 has a chemical composition represented as $SiO_y$ ($x<y<2$).

In the present specification, the aforementioned x, y in the chemical compositions represent average values of molar ratios of oxygen amounts, with respect to silicon amounts, in the negative-electrode active material body 12 and the expansion buffer layer 13, respectively (which hereinafter may also be simply be referred to as "oxygen concentrations"). Note that the chemical compositions of the negative-electrode active material body 12 and the expansion buffer layer 13 are meant as compositions excluding any lithium that may have been added to or occlude by the negative-electrode active material body 12 and the expansion buffer layer 13. Moreover, the negative-electrode active material body 12 and the expansion buffer layer 13 only need to substantially have the aforementioned chemical compositions, and may contain impurities such as Fe, Al, Ca, Mn, and Ti.

Although there are no particular limitations as to the material composing the current collector 11, copper, a copper alloy or the like is generally used. The sheet-like current collector 11 is produced by electrolytic technique or rolling technique. Moreover, there are no particular limitations as to the thickness of the negative electrode current collector, which may be no less than 1 μm and no more than 50 μm, for example.

As described above, the chemical composition of the negative-electrode active material body 12 is represented as $SiO_x$ ($0.1 \leq x \leq 1.2$). Generally speaking, in any negative-electrode active material that contain silicon, as its oxygen concentration decreases (i.e., as the aforementioned x decreases), a higher charge-discharge capacity will be obtained but the coefficient of volumetric expansion due to charging will increase. On the other hand, as the oxygen concentration in the negative-electrode active material increases (i.e., as the aforementioned x increases), the coefficient of volumetric expansion will be reduced but the charge-discharge capacity will become lower. Moreover, as the aforementioned x becomes closer to 2, the electrode plate will have a larger resistance, thus becoming more susceptible to polarization. In the negative-electrode active material body 12 of the present embodiment, the aforementioned x is 0.1 or more, so that expansion and contraction due to charging and discharging are reduced. Therefore, peeling of the negative-electrode active material body 12 from the current collector 11 is suppressed, whereby deteriorations in the current collecting ability and charge-discharge cycle characteristics due to peeling of the negative-electrode active material body 12 can be prevented. Moreover, since x is 1.2 or less, a sufficient charge-discharge capacity can be secured, and high charge-discharge characteristics can be maintained. Moreover, the resistance of the electrode plate can be kept low, and thus polarization can also be suppressed. If the aforementioned x is no less than 0.1 and no more than 0.6, moderate charge-discharge cycle characteristics and high charge-discharge characteristics can be obtained with a good balance, with an increased certainty.

Note that, although the oxygen concentration profile in the negative-electrode active material body 12 is preferably generally uniform along the thickness direction, it may also vary along the thickness direction. For example, the negative-electrode active material body 12 may have an oxygen concentration profile which monotonously increases from its interface with the current collector 11 toward its interface with the expansion buffer layer 13, so long as the average value of the molar ratio of the oxygen amount in the negative-electrode active material body 12, with respect to the silicon amount, falls within the aforementioned x range.

The negative-electrode active material body 12 can be formed by sputtering technique or vapor deposition technique, for example. Specifically, by using a silicon source such as silicon, silicon oxide, or a mixture of silicon and silicon oxide, SiOx may be deposited on the current collector 11 (made of e.g. a copper foil) within a vacuum chamber, whereby a negative-electrode active material body 12 which would macroscopically appear as a film can be formed.

Macroscopically, the negative-electrode active material body 12 in the present embodiment is in the form of a film on the surface of the current collector 11; microscopically, however, it is composed of a plurality of active material particles as illustrated. Moreover, these active material particles grow along the normal direction to the surface of the current collector 11. Note that the growth direction of the active material particles is not limited thereto, but may be tilted with respect to the normal direction to the surface of the current collector 11.

The covering layer 14 is a layer which is composed of silicon dioxide ($SiO_2$ layer). However, in order to take errors of compositional analysis into consideration, the present specification assumes that the covering layer 14 encompasses any layer having a chemical composition represented as $SiO_z$ ($0.1 \leq x \leq 1.2$), for example. Forming such a covering layer 14 on the negative-electrode active material body 12 provides the following advantages.

In conventional constructions, the negative-electrode active material body ($SiO_x$) would be in direct contact with the electrolytic solution on the surface of the negative electrode, so that a coating of a decomposition product from the electrolytic solution would occur on the negative electrode surface. Since this coating has a low ionic conductivity and a high resistance, the coating promotes polarization, thus lowering the charge-discharge capacity of the negative electrode. On the other hand, in the present embodiment, the covering layer 14 is formed so as to cover the negative-electrode active material body 12, whereby contact between the negative-electrode active material body 12 and the electrolytic solution is suppressed. Therefore, decomposition reaction of the electrolytic solution can be suppressed.

The covering layer 14 in the present embodiment has a thickness t which is greater than 1 nm and no more than 10 nm. Since the covering layer 14 has poor electrical conductivity, if its thickness t exceeds 10 nm, the resistance will become too high and thus promote polarization, whereby the charge-discharge capacity will be lowered. On the other hand, if the thickness t of the covering layer 14 is less than 1 nm, the decomposition reaction of the electrolytic solution caused by the negative-electrode active material body 12 will not be adequately suppressed. More preferably, the thickness t of the covering layer 14 is greater than 1 nm and no more than 5 nm, and more preferably greater than 1 nm and no more than 3 nm, whereby decrease in the charge-discharge capacity due to the covering layer 14 can be suppressed with an increased certainty, and formation of a coating due to decomposition of the electrolytic solution can be suppressed.

Note that it is unlikely for a natural oxide film ($SiO_2$) to be formed on the surface of the negative-electrode active material body represented as $SiO_x$. Even if it is formed, its thickness will be 1 nm or less. Moreover, a natural oxide film will not be uniformly formed on the surface of the negative-electrode active material body, but rather include a multitude of pinholes, and therefore cannot adequately suppress contact between the negative-electrode active material body 12 and the electrolytic solution. Therefore, the covering layer 14 is not a natural oxide film, but is a layer which is intentionally formed on the surface of the negative-electrode active material body 12 under conditions such that a high mole fraction of oxygen is obtained, for example. Alternatively, it may be a relatively thick oxide film which is formed by purposely oxidizing the surface of the negative-electrode active material body 12.

Although the covering layer 14 shown in FIG. 1 covers the entire surface of the plurality of active material particles composing the negative-electrode active material body 12, the covering layer 14 only needs to be formed so as to cover at least a portion of the surface of the negative-electrode active material body 12. Preferably, the covering layer 14 is formed so as to cover portions of the surface of the negative-electrode active material body 12 that are in contact with the electrolytic solution. For example, in the negative-electrode active material body 12 composed of a plurality of active material particles, if the gaps between active material particles are so small that only the upper faces of the active material particles are in contact with the electrolytic solution, at least the upper faces of the active material particles may be covered by the covering layer 14 in order to adequately suppress decomposition of the electrolytic solution.

Moreover, the covering layer 14 does not need to be uniformly formed across the surface of the negative-electrode active material body 12. For example, the covering layer 14 may be formed so as to be thicker at portions of the surface of the negative-electrode active material body 12 which are in contact with the electrolytic solution than at portions which are unlikely to be in contact with the electrolytic solution. In that case, the aforementioned range of the "thickness t of the covering layer 14" only needs to be satisfied by the thickness of the covering layer 14 located at portions of the surface of the negative-electrode active material body 12 that are in contact with the electrolytic solution. In other words, it is greater than 1 nm and no more than 10 nm, and preferably greater than 1 nm and no more than 5 nm.

Furthermore, the covering layer 14 may be a porous film. This will make it possible to suppress the decomposition reaction of the electrolytic solution caused by the negative-electrode active material body 12 without hindering occlusion and release of lithium by the negative-electrode active material body 12.

In the present embodiment, the expansion buffer layer 13 having a chemical composition represented as $SiO_y$ is formed between the negative-electrode active material body 12 and the covering layer 14. The oxygen concentration in the expansion buffer layer 13 is higher than the oxygen concentration in the negative-electrode active material body 12 ($x<y$), and lower than the oxygen concentration of 2 in the covering layer 14 ($y<2$). By providing such an expansion buffer layer 13, it becomes possible to reduce the difference in expansion coefficient between the negative-electrode active material body 12 and the covering layer 14 which is due to a difference between the oxygen concentration in the negative-electrode active material body 12 and the oxygen concentration in the covering layer 14. Thus, it becomes possible to prevent the covering layer 14 from peeling from the negative-electrode active material body 12 due to expansion/contraction of the negative-electrode active material body 12. This will be specifically described below.

In the case of forming the covering layer 14 directly on the negative-electrode active material body 12, the covering layer 14 may not be able to accommodate the volumetric changes associated with charging and discharging of the negative-electrode active material body 12, so that the covering layer 14 may crack, or the covering layer 14 may locally peel from the negative-electrode active material body 12. If peeling of the covering layer 14 occurs, the portions of the surface of the negative-electrode active material body 12 that are directly in contact with the electrolytic solution will increase in area, so that a coating is likely to be formed due to decomposition of the electrolytic solution. On the other hand, if the expansion buffer layer 13 is formed between the negative-electrode active material body 12 and the covering layer 14, the stress which is applied to the covering layer 14 due to expansion of the negative-electrode active material body 12 is alleviated, so that peeling of the covering layer 14 can be suppressed. As a result, the effect by the covering layer 14 can be maintained at a high level even after repetitive charging and discharging, whereby the charge-discharge cycle characteristics can be further improved.

Moreover, although the expansion buffer layer 13 has a charge-discharge capacity which is lower than that of the negative-electrode active material body 12, the expansion buffer layer 13 can also function as an active material (i.e., capable of being involved in the charging and discharging), and thus the silicon contained in the negative-electrode active material layer 15 can be effectively used.

The expansion buffer layer 13 may have a generally uniform oxygen concentration profile along the thickness direction, but in order to suppress peeling of the covering layer 14 more effectively, it is preferable that the oxygen concentration along the depth direction of the expansion buffer layer 13 increases from the negative-electrode active material body 12 toward the covering layer 14. In this case, the oxygen concentration preferably undergoes a gradual increase, but may alternatively have a stepwise (non-gradual) increase.

In particular, if the oxygen concentration along the depth direction of the expansion buffer layer 13, i.e., the molar ratio of the oxygen amount with respect to the silicon amount, is the aforementioned x at the interface between the expansion buffer layer 13 and the negative-electrode active material body 12 and 2 at the interface between the expansion buffer layer 13 and the covering layer 14, then gradual composition changes through chemical bonds can be obtained from the upper face of the negative-electrode active material body 12 to the lower face of the covering layer 14, so that the covering layer 14 is more firmly held onto the surface of the negative-electrode active material body 12. As a result, deterioration in the charge-discharge cycle characteristics due to peeling of the covering layer 14 can be suppressed more effectively.

In order to suppress peeling of the covering layer 14 with an increased certainty, it is preferable that the thickness of the expansion buffer layer 13 is 1 nm or more, for example. Hereinafter, with reference to the drawings, the thickness of the expansion buffer layer 13 will be specifically described.

Figure 2:
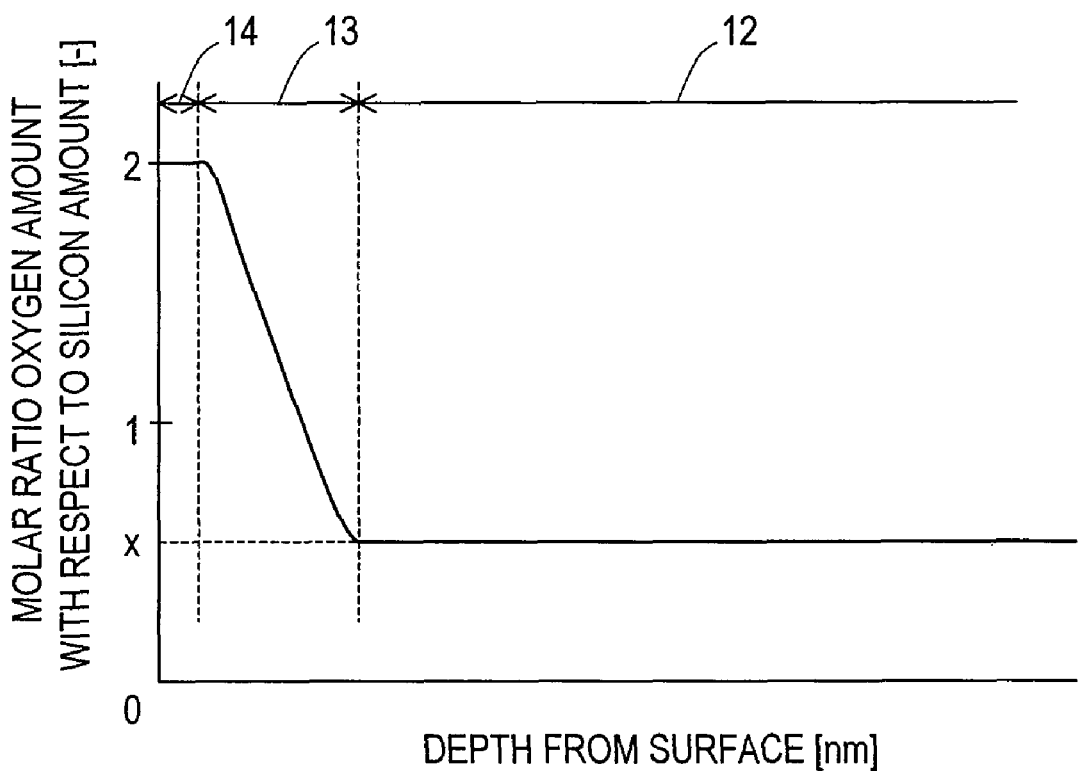
FIG. 2 A schematic diagram illustrating an exemplary mole fraction of oxygen along the thickness direction of a negative-electrode active material layer according to the present invention.

FIG. 2 is a diagram showing an exemplary oxygen concentration profile along the thickness direction of the negative-electrode active material layer 15. In this example, the negative-electrode active material body 12 has a generally uniform oxygen concentration along the thickness direction. In such a case, "thickness of the expansion buffer layer 13" refers to, out of the negative-electrode active material layer 15, the thickness of a portion in which the molar ratio of the oxygen amount with respect to the silicon amount is greater than x ($0.1 \leq x \leq 1.2$) and less than 2. As in the illustrated example, if the boundary between the expansion buffer layer 13 and the negative-electrode active material body 12 and covering layer 14 is relatively clear, the thickness of the expansion buffer layer 13 is preferably 1 nm or more, and more preferably 2 nm or more.

On the other hand, if it is difficult to identify the boundary between the negative-electrode active material body 12 and the expansion buffer layer 13 based on the oxygen concentration profile along the thickness direction of the negative-electrode active material layer 15, e.g., when the oxygen concentration has a monotonous increase from the surface of the current collector 11 toward the covering layer 14, any portion of the negative-electrode active material layer 15 in which the oxygen concentration is 1.2 or less may be regarded as the "negative-electrode active material body 12", and the "expansion buffer layer 13" may be designated in between the negative-electrode active material body 12 as such and the covering layer 14. In this case, too, it is preferable that the thickness of the expansion buffer layer 13 is 1 nm or more.

Note that, although the expansion buffer layer 13 is provided between the negative-electrode active material body 12 and the covering layer 14 in the negative electrode 100 shown in FIG. 1, the negative electrode according to the present invention may not include any expansion buffer layer 13. For example, even in a construction where the negative-electrode active material body 12 and the covering layer 14 are directly in contact with each other, the decomposition reaction of the electrolytic solution can be suppressed by the covering layer 14, and thus the charge-discharge cycle characteristics can be improved.

Next, examples of a production method and an evaluation method for the negative electrode of the present embodiment will be described.

(1) Production of the Negative-Electrode Active Material Layer

Figure 3:
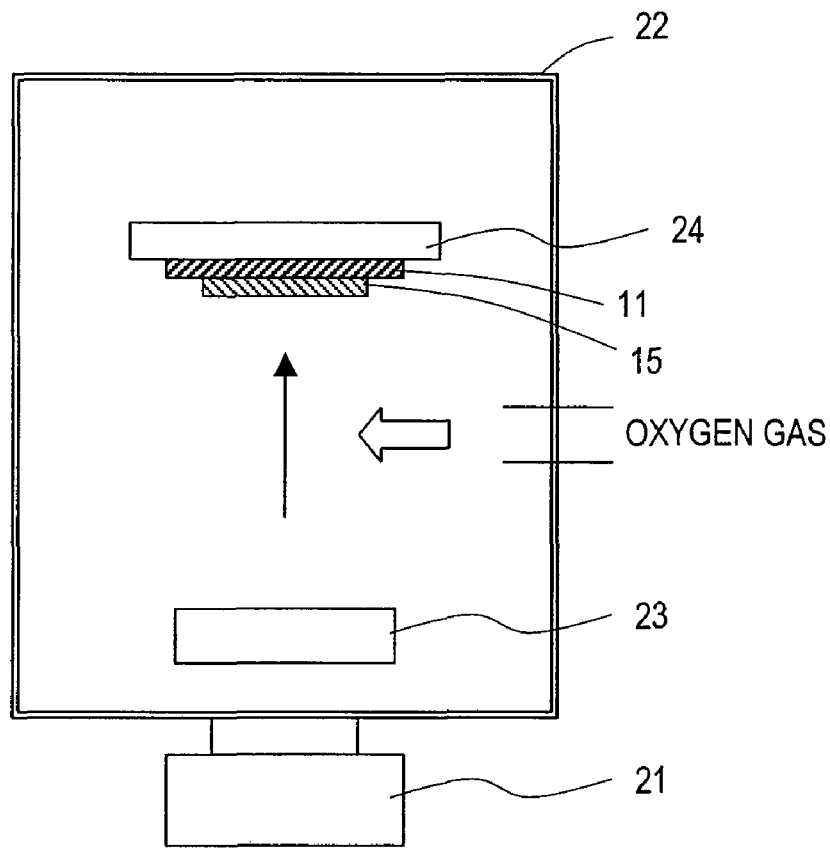
FIG. 3 A schematic illustration showing the construction of a production apparatus for the negative electrode according to Embodiment 1 of the present invention.

FIG. 3 is a schematic illustration showing the construction of a production apparatus for the negative electrode of the present invention. In FIG. 3, the vacuum chamber 22 is evacuated by an evacuation pump 21. First, into a carbon crucible 23 which is placed in the vacuum chamber 22, silicon (tablets obtained by molding particles, lumps, or powder) having a purity of 99.99% or more is inserted as an evaporation source, and is melted by being irradiated with an electron beam by an electron (EB) gun (not shown). Thus, on a current collector 11 of e.g. a copper foil which is placed so as to oppose the carbon crucible 23, a negative-electrode active material layer 15 containing a negative-electrode active material body 12 which has a chemical composition represented as $SiO_x$ is produced by vapor deposition technique. The current collector 11 is held by a holder 24.

Since only a silicon film would be obtained by merely vapor-depositing silicon in a vacuum, an oxygen gas is introduced in the present embodiment, and a reactive evaporation is carried out which involves vapor-depositing silicon while allowing it to react, thereby forming the negative-electrode active material layer 15. The x value of the resultant negative-electrode active material body 12 can be controlled by adjusting the oxygen gas amount to be introduced into the aforementioned vacuum chamber (i.e., the oxygen concentration in the atmosphere).

Moreover, after the negative-electrode active material body 12 of a predetermined thickness is formed, the oxygen concentration in the atmosphere may be increased while continuing the reactive evaporation, whereby the aforementioned expansion buffer layer 13 and covering layer 14 can be formed on the surface of the negative-electrode active material body 12.

In this manner, the negative-electrode active material layer 15 having the negative-electrode active material body 12, the expansion buffer layer 13, and the covering layer 14 can be formed.

(2) Determination of the x Value in $SiO_x$

In the negative-electrode active material body 12 represented as $SiO_x$, the x value can be determined through x-ray fluorescence spectrometry. In a region extending to a depth of several μm from the surface layer of the resultant negative-electrode active material layer 15, i.e., in a region where only the negative-electrode active material body 12 is formed, the x value in $SiO_x$ can be determined by employing a fundamental parameter technique in an x-ray fluorescence spectrometry using the O—Kα line, for example. For the x-ray fluorescence spectrometry, RIX3000 manufactured by Rigaku Industrial Corp. is used, for example. As the conditions of the x-ray fluorescence spectrometry, for example, rhodium (Rh) may be used as a target, and a tube voltage of 50 kV and a tube current of 50 mA may be used. Since the x value determined here is calculated from the intensity of the O—Kα line which is detected in a measurement region on a substrate, it is an average value within the measurement region.

As another method, the x value can be determined by allowing the entire resultant negative-electrode active material body 12 to combust. In this case, a negative electrode in which only the negative-electrode active material body 12 is formed may be used as a sample, which is obtained by stopping the formation of the negative-electrode active material layer before the aforementioned expansion buffer layer 13 and surface layer 14 are formed. For example, the negative-electrode active material body 12 may be inserted in a crucible of graphite which is placed in a combustion tube, and the crucible may be electrified so as to generate heat. At this time, the temperature is about 3000° C. An He gas is allowed to flow as a carrier in this combustion tube, and the amounts of $CO_2$ and CO generated are quantified, thus measuring the amount of oxygen. Then, the x value in $SiO_x$ can be determined from the weight which has been measured in advance.

(3) X-Ray Photoelectron Spectroscopy (XPS) Measurement

The oxidation states of silicon along the depth direction of the negative-electrode active material layer 15 can be identified by applying the XPS technique to measure $Si_{2p}$, which indicates states of silicon oxides. Silicon oxides are considered to exist in such a manner that the following five kinds of tetrahedron unit structures homogenously exist without exhibiting phase separation, while sharing vertices by arbitrary proportions: Si (Si—$Si_4$; where the atom before "—" represents an atom which is located in the center of a tetrahedron and the atoms after "—" represent atoms located at the four vertices, which similarly applies hereinafter); $Si_2O$ (Si—$Si_3O$); SiO (Si—$Si_2O_2$); $Si_2O_3$ (Si—$SiO_3$); and $SiO_2$ (Si—$O_4$). It is generally known that in the unit structure of a silicon oxide having a chemical composition represented as $SiO_x$, a silicon atom is located in the center of a tetrahedron, whereas silicon or oxygen is located at the four bonding arms which are formed through $sp^3$ hybridization.

In the case of Si (i.e., x=0 in $SiO_x$), Si is located in all vertices, and in the case of $SiO_2$ (i.e., x=2 in $SiO_x$), O is located in all vertices. The $Si_{2p}$ binding energy for Si is 99±1 eV, and the $Si_{2p}$ binding energy for $SiO_2$ is 103±1 eV, thus indicative of mutually different $Si_{2p}$ binding energies. Furthermore, it is 100±1 eV in the case where one of the vertices is O and three are Si; 101±1 eV in the case where two of the vertices are O and two are Si; and 102±1 eV in the case where three of the vertices are O and one is Si. By examining these energy states from the XPS spectrum of Si2p, it is possible to identify what sorts of silicon oxides exist.

For the XPS measurement, XPS-7000 manufactured by Rigaku Industrial Corp. is used, for example. The XPS measurement can be taken by, for example, using Al—Kα as an x-ray source, under the conditions that the tube voltage is 10 kV and the tube current is 10 mA. Moreover, in order to determine the thickness of an $SiO_2$ layer that is formed on the surface, it is preferable to perform etching with an Ar gas, from the surface to a depth where no structure change can be observed, e.g., 200 to 300 nm.

The above etching can be performed under the conditions of an acceleration voltage of 500V, an etching angle of 90°, and an ion current density of 160 μA/cm$^2$, for example. The etching rate at this time may be about 5 nm/min as translated into $SiO_2$.

In the XPS spectrum, $SiO_2$ will be observed as a broad peak of 103.5 eV, and $SiO_x$ as that of 99 to 103.5 eV. The 103.5 eV peak for $Si_{2p}$ in XPS is prominent near the surface, but this intensity peak will gradually lower as the surface layer portion is removed through etching.

In the present specification, the measurement data of the negative-electrode active material layer 15 according to the present invention is that which has been corrected by using Ar. That is, it is a measurement data which has been obtained by performing a charge correction based on a shift of Ar2p when using 242.3 eV as a reference value for Ar2p.

Note that, instead of x-ray fluorescence spectrometry and x-ray photoelectron spectroscopy measurements, an energy dispersive x-ray spectroscopy using a transmission electron microscope may also be performed.

(4) Production Method of a Coin-Type Lithium-Ion Secondary Battery

As an representative example of a lithium-ion secondary battery in which a negative electrode according to the present invention is used, an exemplary coin-type lithium-ion secondary battery (hereinafter also referred to as a coin battery) will be illustrated below, with reference to FIG. 4.

Figure 4:
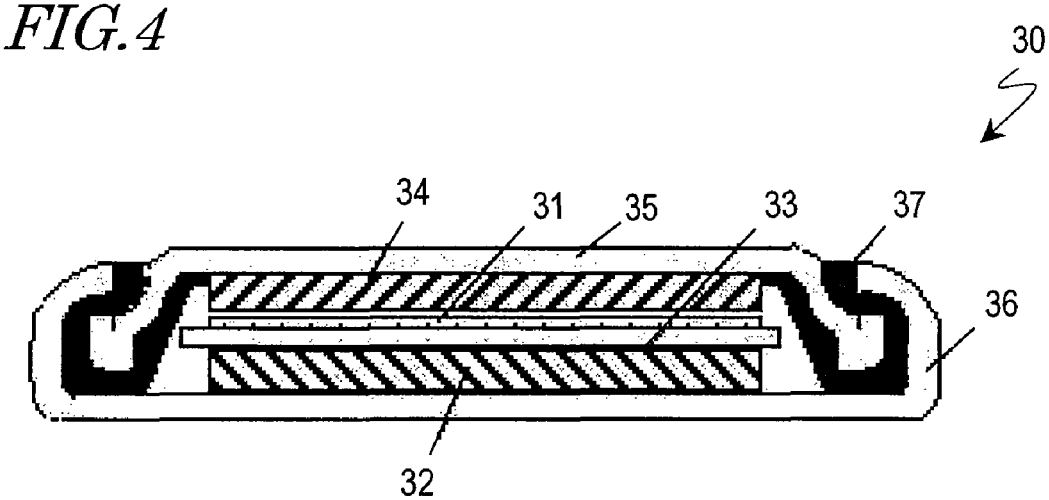
FIG. 4 A schematic cross-sectional view of a coin battery according to Embodiment 1 of the present invention.

FIG. 4 is a schematic cross-sectional view of a coin battery in which the negative electrode according to the present invention is used. In FIG. 4, a coin battery 30 includes: a positive electrode 32 which is capable of occlusion and release of lithium ions; a negative electrode 31 opposing the positive electrode 32; and a separator 33 which is interposed between the positive electrode 32 and the negative electrode 31 and which contains an electrolyte that conducts lithium ions. Together with the separator 33 and the electrolyte, the positive electrode 32 and the negative electrode 31 are accommodated within a case 36, by using a gasket 37 and a sealing plate 35.

The coin battery shown in FIG. 4 can be produced as follows, for example.

First, after a negative-electrode active material layer 15 is formed by the above-described method on a current collector 11 composed of a copper foil, it is cut out in a diameter of e.g. 12.5 mm, thus producing a negative electrode 31.

The negative electrode 31 and a metal-lithium positive electrode 32 (e.g. thickness: 300 µm; diameter: 15 mm) are disposed so as to oppose each other via a polyethylene separator 33 (e.g. thickness: 25 µm; diameter: 17 mm), and are placed in a "2016" size coin battery case 36.

Next, an electrolyte for a lithium-ion secondary battery is injected into the aforementioned case 36, and in order to fill up the shortage of intra-case height (space within the case), a stainless steel spacer 34 is inserted. Thereafter, a sealing plate 35 having a resin gasket 37 around its periphery is placed on the case 36, and the case 36 is crimped at the periphery. Thus, a "2016" size coin battery (e.g. thickness: 1.6 mm; diameter: 20 mm) 30 is obtained.

As an electrolyte for the lithium-ion secondary battery, any commonly-known electrolytic solution, such as an electrolytic solution which is obtained by dissolving a solute of 1M $LiPF_6$ in a 1:1 (volume ratio) mixed solvent of ethylene carbonate and diethyl carbonate, for example, can be used.

Note that, the constituent elements of the lithium-ion secondary battery according to the present invention are not particularly limited except for using the aforementioned negative electrode of the present invention, and a variety of those which are commonly-used as materials for lithium-ion batteries can be selected within bounds such that the effects of the present invention are not undermined.

In the present embodiment, in order to evaluate the electrochemical characteristics of the negative electrode, metal lithium is used as a material of the counter electrode (positive electrode). However, the material of the positive electrode 32 in an actual battery may be a lithium-containing transition metal oxide such as $LiCoO_2$, $LiNiO_2$, or $LiMn_2O_4$, or a lithium-containing transition metal sulfide such as $LiTiS_2$ or $LiMOS_2$, for example.

As the separator 33, for example, a polyolefin-type porous film such as a polypropylene porous film or a multilayered porous film of polyethylene/polypropylene can be used.

The following can also be used as a solvent for the electrolyte, for example: a cyclic carbonate, typically propylene carbonate (PC) or ethylene carbonate (EC); an acyclic carbonate, typically diethyl carbonate (DEC) or dimethyl carbonate (DMC); a cyclic carboxylate, typically γ-butyrolactone (GBL) or γ-valerolactone (GVL); an acyclic ether, such as dimethoxymethane (DMM) or 1,3-dimethoxypropane (DMP); or a cyclic ester, such as tetrahydrofuran (THF) or 1,3-dioxolane (DOL). It will be appreciated that two or more kinds of them may be used as a mixed solvent.

The following can also be used as a solute for the electrolyte, for example: an anionic lithium salt of inorganic acid, typically lithium perchlorate ($LiClO_4$), lithium tetrafluoroborate ($LiBF_4$), or lithium hexafluorophosphate ($LiPF_6$); or an anionic lithium salt of organic acid, such as lithium trifluoromethanesulfonate ($LiSO_3CF_3$) or lithium(bis)trifluoromethanesulfonate imide (($CF_3SO_2)_2NLi$). It will be appreciated that two or more kinds of them may be used as a mixed solvent.

(5) Evaluation Method

Evaluations of a lithium-ion secondary battery according to the present invention can be made by measuring a charge-discharge capacity by a constant current charge-discharge method.

In the case of a coin battery which is produced by the method described above with reference to FIG. 4, its charge-discharge capacity as a two-electrode cell is measured. The measurement of the charge-discharge capacity is taken through repetitive cycles, each consisting of charging to 0V with a constant current of 1 mA and discharging to 1.5V with a constant current of 1 mA, for example. The ambient temperature during the measurement is room temperature (e.g. 25° C.).

EXAMPLE

Hereinafter, Examples of a negative electrode and a lithium-ion secondary battery according to the present invention will be described.

Example 1

1. Production of Negative-Electrode Active Material Layer

First, by using a production apparatus having the structure shown in FIG. 3, a negative-electrode active material layer was produced on the surface of a current collector. The production method will be specifically described.

In advance, silicon tablets (with a purity of 99.99% or more) were inserted in the carbon crucible 23, which was placed within the vacuum chamber 22, and after setting the pressure within the vacuum chamber 22 to 0.005 Pa, an oxygen gas was introduced at a flow rate of 70 sccm, and the pressure within the vacuum chamber 22 was set to 0.13 Pa.

Thereafter, under the conditions of voltage: −9 kV and EB current: 400 mA, an electron beam was radiated from the electron gun onto the aforementioned silicon tablets, thus allowing the silicon to melt and vapor-deposited onto the current collector 11, which was disposed so as to oppose the carbon crucible 23. As the current collector 11, a copper foil having a thickness of 50 μm was used. This vapor deposition was continued until a thin film (negative-electrode active material body) having a thickness of 10 μm by a thickness gauge was formed.

Immediately after the thickness of the thin film reached 10 μm, the oxygen gas flow rate was increased to sccm, and film formation was further continued for seconds, whereafter the current collector 11 was held by the holder 24. The thin film (negative-electrode active material layer) which was formed on the current collector 12 had a weight of 2.4 mg.

2. Measurement Results of Oxygen Concentration in Negative-Electrode Active Material Layer The negative-electrode active material body obtained by the above-described method was subjected to an x-ray fluorescence spectrometry under the aforementioned conditions, thus determining the oxygen concentration (x value in $SiO_x$) in the negative-electrode active material body. As a result, the x value was 0.6.

Moreover, by the aforementioned x-ray photoelectron spectroscopy, the $Si_{2p}$ binding energy along the depth direction of the negative-electrode active material layer was measured, and the oxidation states of silicon along the depth direction were examined. The measurement results are shown in FIG. 5(*a*).

Figure 5:
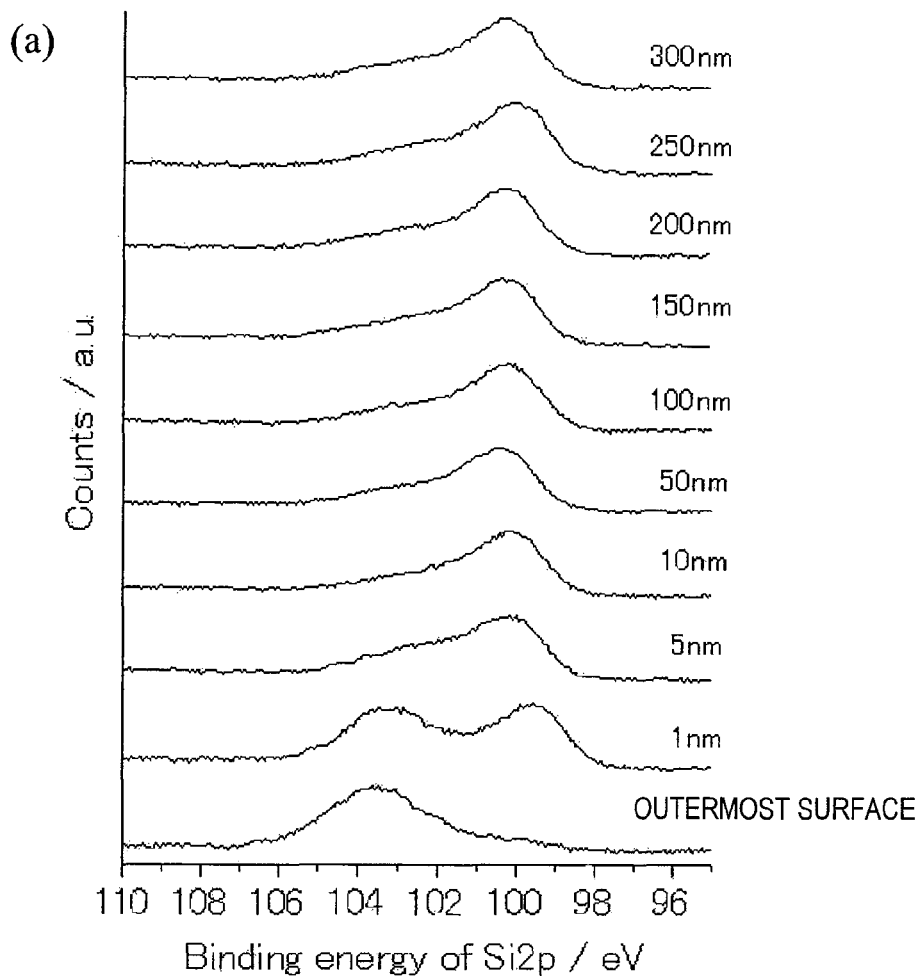
FIG. 5 (a) is a diagram showing an $Si_{2p}$ binding energy spectrum, by x-ray photoelectron spectroscopy, of the negative electrode according to Example 1 of the present invention; and (b) is a schematic diagram showing a mole fraction of oxygen along the thickness direction of the negative-electrode active material layer, as inferred from the $Si_{2p}$ binding energy spectrum of (a).
Figure 5:
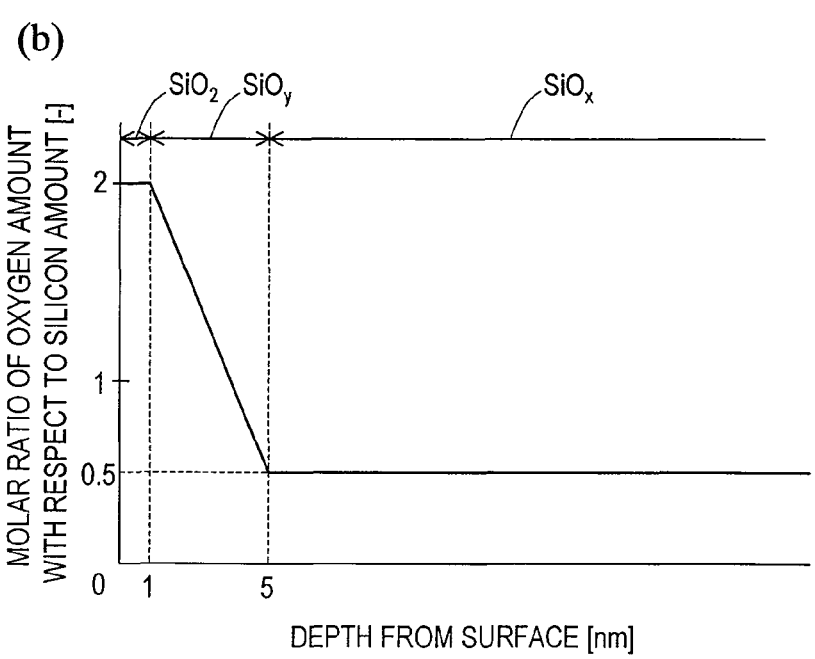

In the graph shown in FIG. 5(*a*), the horizontal axis represents $Si_{2p}$ binding energy (eV), and the vertical axis represents photoelectron counts (arbitrary unit). The numerical values shown in the figure represent depths from the outermost surface of the negative-electrode active material layer. The $Si_{2p}$ binding energy at each depth can be determined by performing an etching from the outermost surface of the negative-electrode active material layer to that depth. Note that the "depth" as used herein is a value which is calculated from the etching time, assuming an etching rate of about 5 nm/min as translated into $SiO_2$.

As can be seen from FIG. 5(*a*), in the $Si_{2p}$ binding energy at the outermost surface, a peak was observed at 103.5 eV, which is ascribable to $SiO_2$. In the $Si_{2p}$ binding energy at a depth of 1 nm, broad peaks were observed at 103.5 eV and near 100 eV. The broad peak near 100 eV is ascribable to $SiO_y$. At a depth of 5 nm, the 103.5 eV peak was very small, and the broad peak near 100 eV became predominant. In the $Si_{2p}$ binding energy at depths of 10 nm or more, the 103.5 eV peak was no longer observed, and only a broad peak near 100 eV was observed.

Therefore, it was inferred that the covering layer ($SiO_2$ layer) formed on the surface layer of the negative-electrode active material layer had a thickness of about 1 nm. It was also found that the region of the negative-electrode active material layer defined by a depth of about 5 nm or more from the outermost surface was the negative-electrode active material body ($SiO_x$, x=0.6). Furthermore, in the region defined by a depth of 1 nm to about 5 nm from the outermost surface, the oxygen concentration decreased from 2 to x, which confirmed that an expansion buffer layer ($SiO_y$ layer) had been formed between the covering layer and the negative-electrode active material body.

A relationship between oxygen concentration in the negative-electrode active material layer and depth, as inferred from these measurement results, is shown in FIG. 5(*b*). Note that FIG. 5(*b*) is a schematic diagram for facilitating understanding of the measurement results, and does not accurately describe the actual oxygen concentration.

3. Production of Coin Battery

After the negative-electrode active material layer was formed by the above method, the current collector having the negative-electrode active material layer formed thereon was cut out in a circular shape with a diameter of 12.5 mm, thus producing a negative electrode of Example 1. By using this negative electrode, a coin battery having the structure shown in FIG. 4 was produced. The method thereof will be specifically described.

First, the aforementioned negative electrode of Example 1 and a metal-lithium positive electrode (thickness: 300 μm, diameter: 15 mm) were disposed so as to oppose each other via a polyethylene separator (thickness: 25 μm, diameter: 17 mm), and were placed in a "2016" size coin battery case.

Next, an electrolyte was injected into the coin battery case. As the electrolyte, an electrolyte obtained by dissolving a solute of 1M $LiPF_6$ into a 1:1 (volume ratio) mixed solvent of ethylene carbonate and diethyl carbonate. Moreover, in order to fill up the shortage of intra-case height (space within the case), a stainless steel spacer was inserted. Thereafter, a sealing plate having a polypropylene gasket around is periphery was placed, and the coin battery case was crimped at the periphery, thereby producing a coin battery of Example 1.

4. Evaluation of Coin Battery

For the coin battery of Example 1 produced as described above, charge-discharge capacity measurements were taken by using the aforementioned evaluation method (1 mA constant current charge-discharge method). The measurement results are shown in FIG. 6 and FIG. 7.

Figure 6:
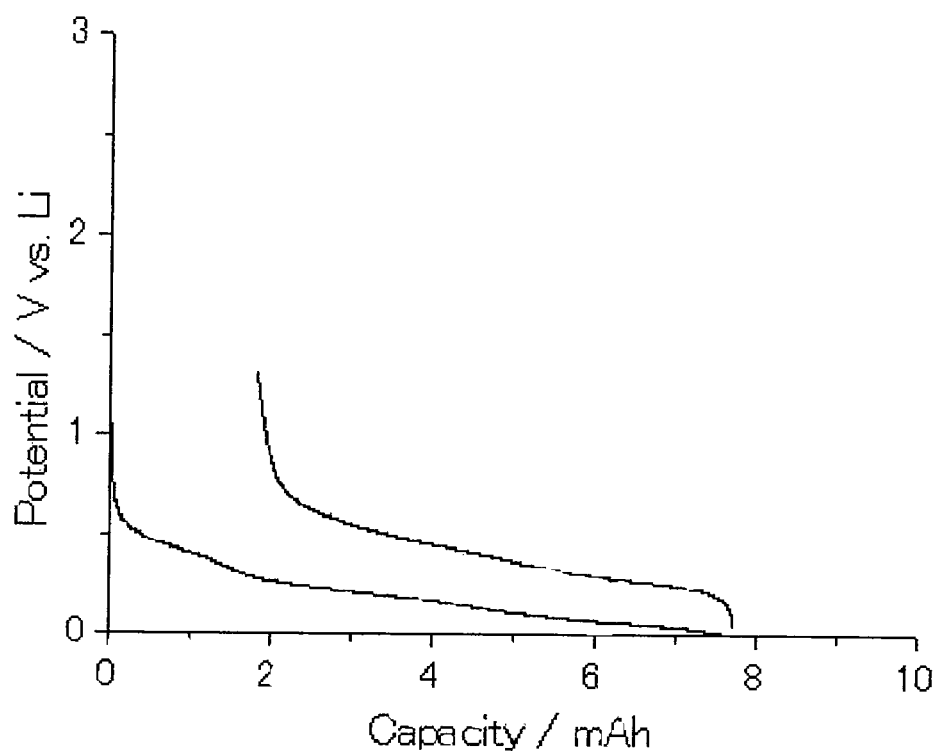
FIG. 6 A diagram showing charge-discharge characteristics of a coin battery according to Example 1 of the present invention.
Figure 7:
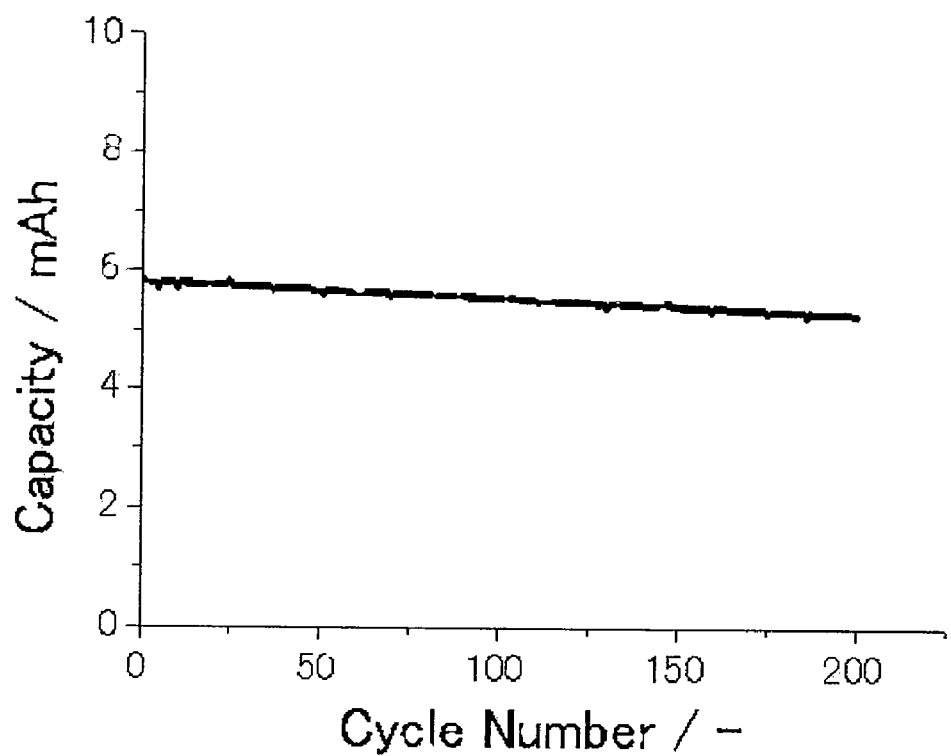
FIG. 7 A diagram showing charge-discharge cycle characteristics of the coin battery according to Example 1 of the present invention.

FIG. 6 is a graph showing the charge-discharge characteristics of the coin battery of Example 1, where the vertical axis represents potential (V) relative to metal lithium, and the horizontal axis represents capacity (mAh). The lower curve is a charge curve, and the upper curve is a discharge curve. FIG. 7 is a graph showing the charge-discharge cycle characteristics of the coin battery of Example 1, where the vertical axis represents capacity (mAh), and the horizontal axis represents a number of cycles (times).

From the results shown in FIG. 6, the charge capacity is 7.5 mAh; the discharge capacity is 5.8 mAh; the irreversible capacity is 1.7 mAh; a gentle curve occurs from the beginning of charging; and the potential difference between the charge curve and the discharge curve is small in the region where the capacity is 3 to 7 mAh. Thus, excellent polarization characteristics and excellent high charge-discharge characteristics were confirmed. Moreover, it was found from FIG. 7 that the coin battery of the present Example initially exhibits a high capacity of about 5.8 mAh, and after 200 cycles still maintains a capacity (about 5.7 mAh) which is equal to or greater than 90% of the initial level, thus having excellent charge-discharge cycle characteristics.

Example 2

A negative-electrode active material layer and a coin battery of Example 2 were produced by methods similar to Example 1, except that the oxygen gas flow rate was increased from 70 sccm to 90 sccm when the film thickness (thickness of the negative-electrode active material body) reached 10 μm. Next, by methods similar to Example 1, oxygen concentration measurements of the negative-electrode active material layer and a charge-discharge characteristics evaluation of the coin battery were taken. The results thereof will be described.

As a result of performing x-ray fluorescence spectrometry for the negative-electrode active material body ($SiO_x$) in the negative-electrode active material layer of Example 2, the x value was found to be 0.59.

Figure 8:
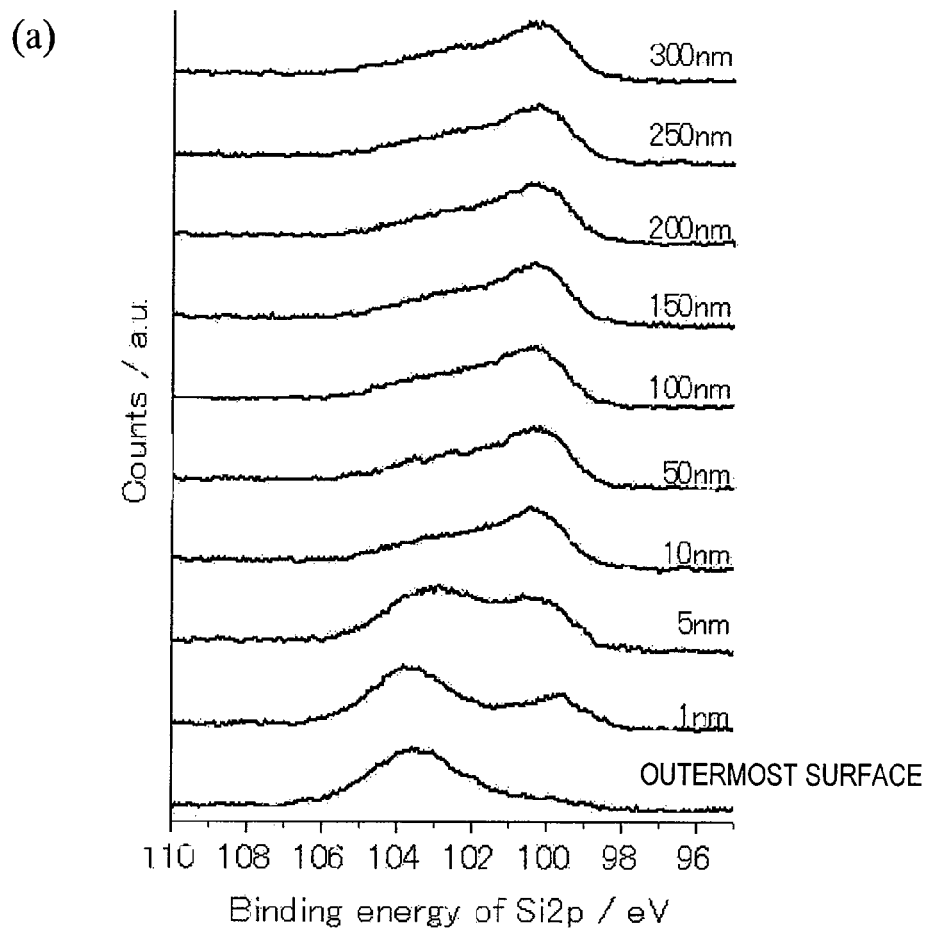
FIG. 8 (a) is a diagram showing an $Si_{2p}$ binding energy spectrum, by x-ray photoelectron spectroscopy, of the negative electrode according to Example 2 of the present invention; and (b) is a schematic diagram showing a mole fraction of oxygen along the thickness direction of the negative-electrode active material layer, as inferred from the $Si_{2p}$ binding energy spectrum of (a).
Figure 8:
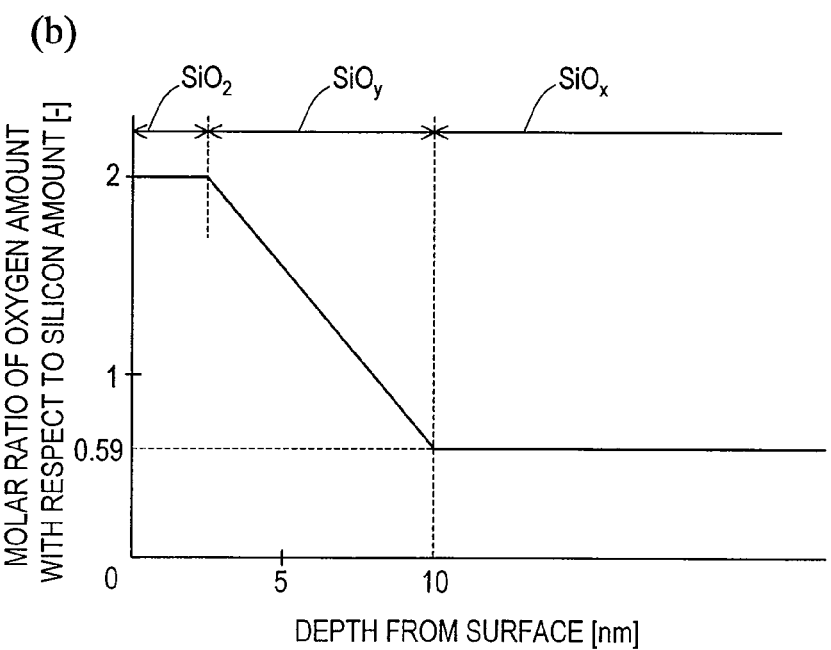

Moreover, results of measuring the $Si_{2p}$ binding energy along the depth direction of the negative-electrode active material layer of Example 2 by x-ray photoelectron spectroscopy are shown in FIG. 8(a).

As can be seen from FIG. 8(a), in the $Si_{2p}$ binding energy at the outermost surface, a peak was observed at 103.5 eV, which is ascribable to $SiO_2$. In the $Si_{2p}$ binding energy at a depth of 1 nm, broad peaks were observed at 103.5 eV and near 100 eV. The broad peak near 100 eV is ascribable to $SiO_y$. At a depth of 5 nm, a clear 103.5 eV peak, which is ascribable to $SiO_2$, was observed. In the $Si_{2p}$ binding energy at a depth of 10 nm, the 103.5 eV peak was very small, and the broad peak near 100 eV became predominant.

Therefore, it was inferred that the covering layer ($SiO_2$ layer) had a thickness between 1 and 5 nm. It was also found that the region of the negative-electrode active material layer defined by a depth of about 10 nm or more from the outermost surface was the negative-electrode active material body ($SiO_x$, x=0.59). Furthermore, it was confirmed that, between the covering layer and the negative-electrode active material body, an expansion buffer layer ($SiO_y$ layer) was formed whose oxygen concentration decreases from 2 to x from the covering layer side toward the negative-electrode active material body side.

A relationship between oxygen concentration in the negative-electrode active material layer and depth, as inferred from these measurement results, is shown in FIG. 8(b). Note that FIG. 8(b) is a schematic diagram for facilitating understanding of the measurement results, and does not accurately describe the actual oxygen concentration.

Figure 9:
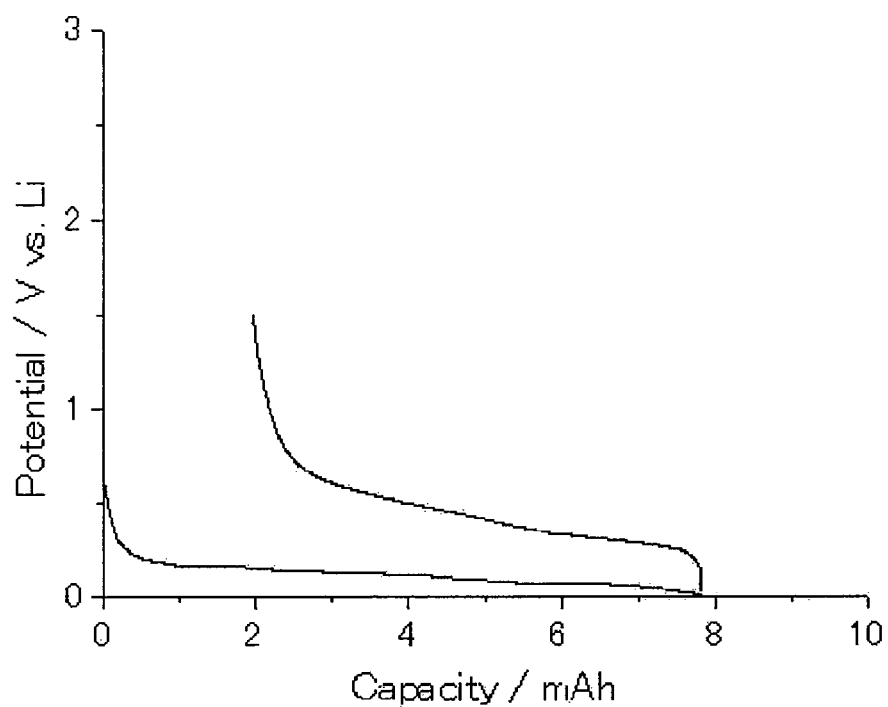
FIG. 9 A diagram showing charge-discharge characteristics of a coin battery according to Example 2 of the present invention.
Figure 10:
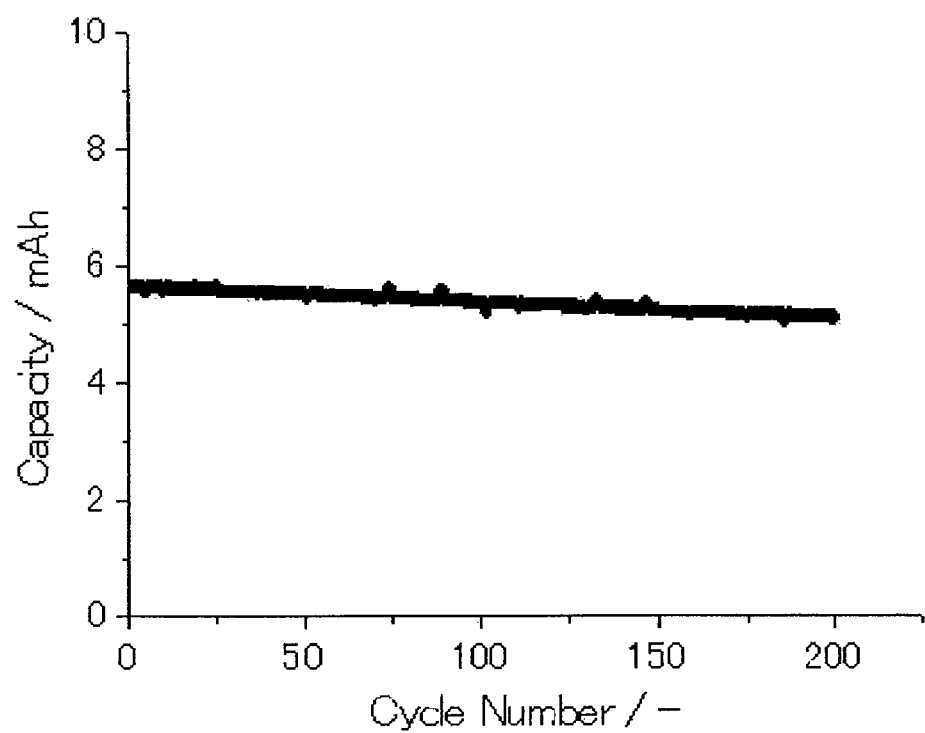
FIG. 10 A diagram showing charge-discharge cycle characteristics of the coin battery according to Example 2 of the present invention.

Next, results of measuring the charge-discharge capacity of the coin battery of Example 2 by the constant current charge-discharge method are shown in FIG. 9 and FIG. 10.

FIG. 9 is a graph showing the charge-discharge characteristics of the coin battery of Example 2, where the vertical axis represents potential (V) relative to metal lithium, and the horizontal axis represents capacity (mAh). The lower curve is a charge curve, and the upper curve is a discharge curve. FIG. 10 is a graph showing the charge-discharge cycle characteristics of the coin battery of Example 2, where the vertical axis represents capacity (mAh), and the horizontal axis represents a number of cycles (times).

From the results shown in FIG. 9, the charge capacity is 7.5 mAh; the discharge capacity is 5.8 mAh; the irreversible capacity is 1.7 mAh; and the potential difference between the charge curve and the discharge curve is small. Thus, excellent polarization characteristics and excellent high charge-discharge characteristics were confirmed. Although the initial potential in the charge curve is lower than in Example 1, this is presumably because polarization is promoted since the expansion buffer layer of Example 2 is thicker than the expansion buffer layer of Example 1. Furthermore, from the results shown in FIG. 10, it was found that the coin battery of Example 2 initially has a high capacity of about 5.8 mAh, and after 200 cycles still maintains a capacity (about 5.1 mAh) which is 88% of the initial level, thus having excellent charge-discharge cycle characteristics.

Comparative Example 1

A negative-electrode active material layer and a coin battery of Comparative Example 1 were produced by methods similar to Example 1, except that the oxygen gas flow rate was increased from 70 sccm to 100 sccm when the film thickness (thickness of the negative-electrode active material body) reached 10 µm. By methods similar to Example 1, oxygen concentration measurements and a charge-discharge characteristics evaluation were taken of the resultant negative-electrode active material layer and coin battery. The results thereof will be described.

As a result of performing x-ray fluorescence spectrometry for the negative-electrode active material ($SiO_x$) in the negative-electrode active material layer of Comparative Example 1, the x value was found to be 0.57.

Figure 11:
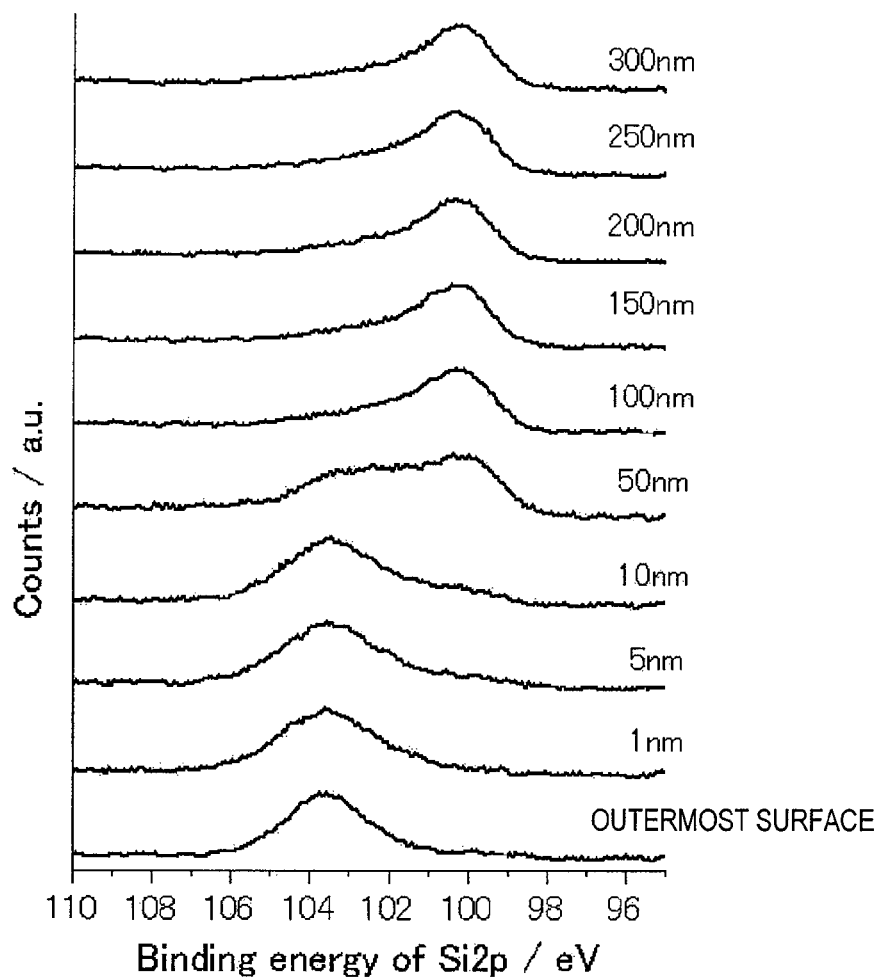
FIG. 11 (a) is a diagram showing an $Si_{2p}$ binding energy spectrum, by x-ray photoelectron spectroscopy, of the negative electrode according to Comparative Example 1 for the present invention; and (b) is a schematic diagram showing a mole fraction of oxygen along the thickness direction of the negative-electrode active material layer, as inferred from the $Si_{2p}$ binding energy spectrum of (a).
Figure 11:
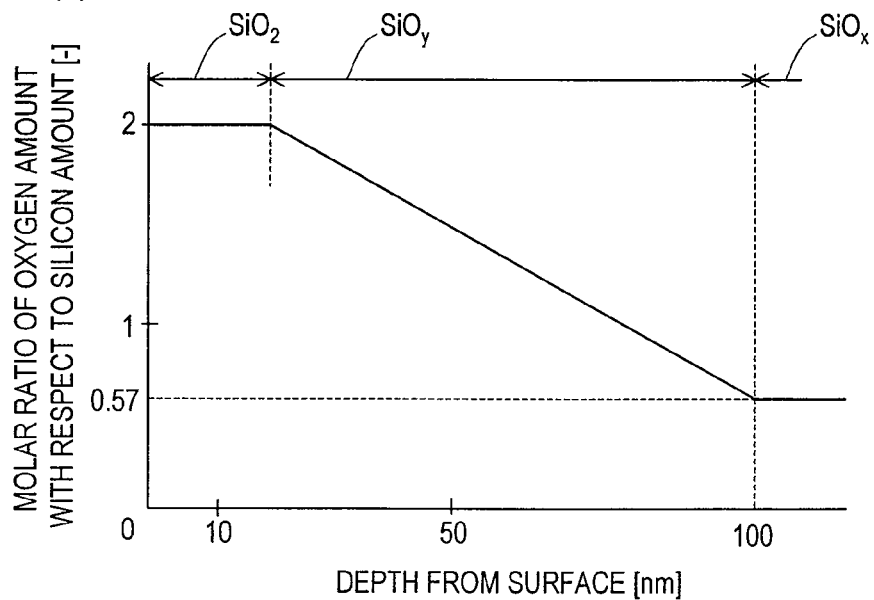

Moreover, results of measuring the $Si_{2p}$ binding energy along the depth direction of the negative-electrode active material layer by the above-described x-ray photoelectron spectroscopy are shown in FIG. 11(a).

As can be seen from FIG. 11(a), in the $Si_{2p}$ binding energy from the outermost surface to a depth of 10 nm, only a 103.5 eV peak, which is ascribable to $SiO_2$, was observed. In the $Si_{2p}$ binding energy at a depth of 50 nm, broad peaks were observed at 103.5 eV and near 100 eV. The broad peak near 100 eV is ascribable to $SiO_y$. At a depth of 50 nm, the 103.5 eV peak is smaller, and the broad peak near 100 eV became predominant. At a depth of 100 nm, the 103.5 eV peak was hardly confirmed, and only a broad peak near 100 eV, which is ascribable to $SiO_x$, was observed.

Therefore, it was inferred that an $SiO_2$ layer had been formed on the surface of the negative-electrode active material layer, with a thickness which is greater than 10 nm and less than 50 nm. It was also found that the region of the negative-electrode active material layer defined by a depth of about 100 nm or more from the outermost surface is the negative-electrode active material body ($SiO_x$, x=0.57). Furthermore, it was confirmed that, between the $SiO_2$ layer and the negative-electrode active material body, an $SiO_y$ layer (x<y<2) was formed whose oxygen concentration decreases from 2 to x from the covering layer side toward the negative-electrode active material body side.

A relationship between oxygen concentration in the negative-electrode active material layer and depth, as inferred from these measurement results, is shown in FIG. 11(b). Note that FIG. 11(b) is a schematic diagram for facilitating understanding of the measurement results, and does not accurately describe the actual oxygen concentration.

Figure 12:
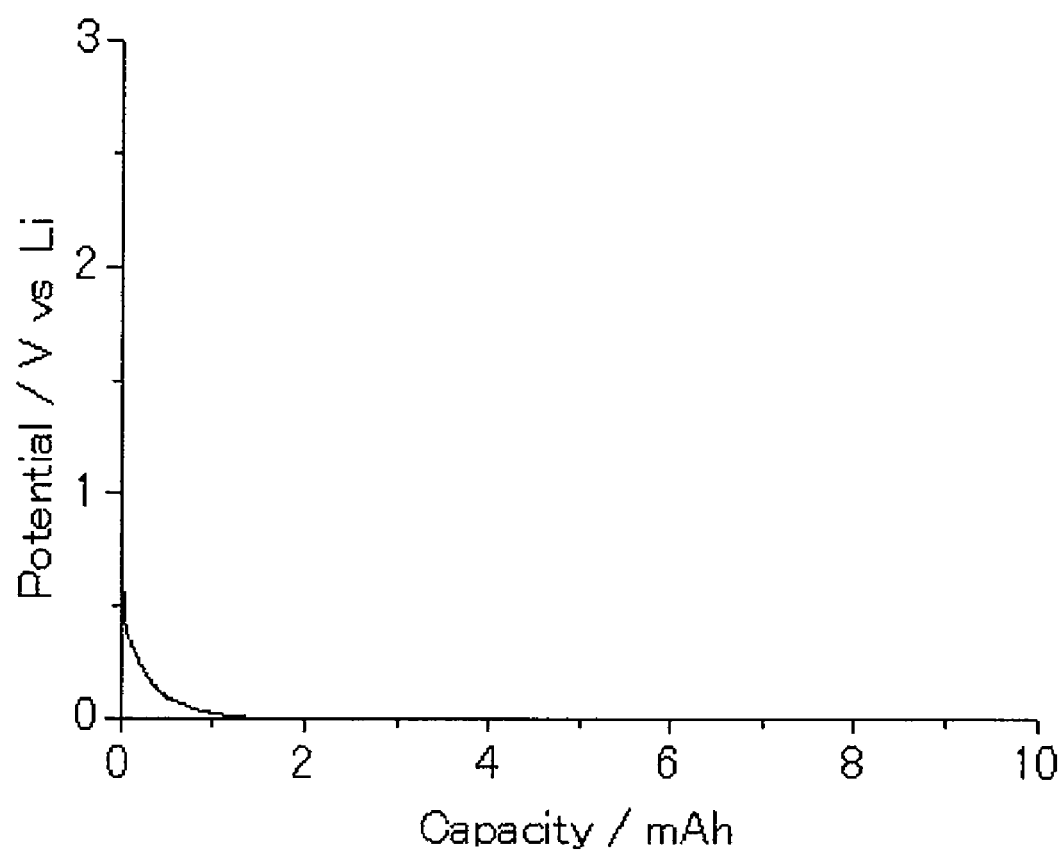
FIG. 12 A diagram showing charge-discharge characteristics of a coin battery according to Comparative Example 1.

Next, results of measuring the charge-discharge capacity of the coin battery of Comparative Example 1 by the constant current charge-discharge method are shown in FIG. 12. FIG. 12 only shows the charge curve.

When charging was attempted with a constant current of 1 mA, large polarization was observed, and hardly any charging occurred. Therefore, it was impossible to carry out a charge-discharge cycle test. This polarization was considered to have occurred because the $SiO_2$ layer, which is a nonconductor, was much thicker than the covering layers in Example 1 and Example 2.

Comparative Example 2

A negative-electrode active material layer and a coin battery of Comparative Example 2 were produced by methods similar to Example 1, except that the film formation was stopped when the film thickness (thickness of the negative-electrode active material body) reached 10 µm. By methods similar to Example 1, oxygen concentration measurements and a charge-discharge characteristics evaluation were taken of the resultant negative-electrode active material layer and coin battery. The results thereof will be described.

As a result of performing x-ray fluorescence spectrometry for the negative-electrode active material body ($SiO_x$) in the negative-electrode active material layer of Comparative Example 2, the x value was found to be 0.6.

Figure 13:
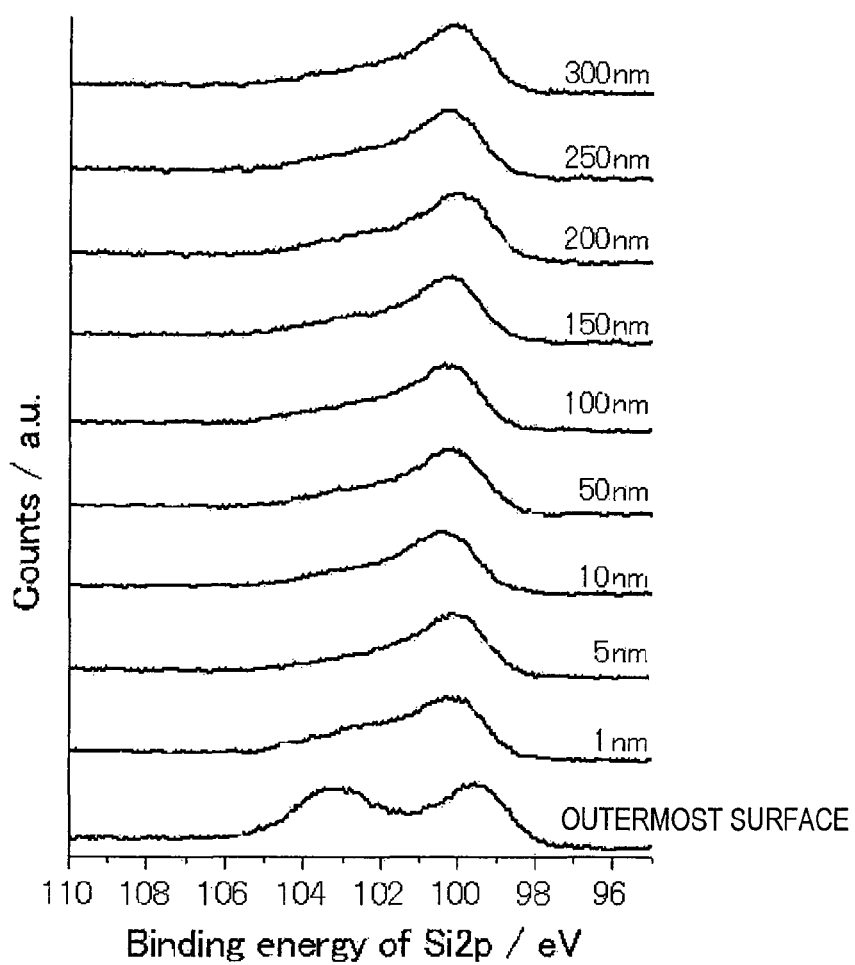
FIG. 13 (a) is a diagram showing an $Si_{2p}$ binding energy spectrum, by x-ray photoelectron spectroscopy, of the negative electrode according to Comparative Example 2 for the present invention; and (b) is a schematic diagram showing a mole fraction of oxygen along the thickness direction of the negative-electrode active material layer, as inferred from the $Si_{2p}$ binding energy spectrum of (a).
Figure 13:
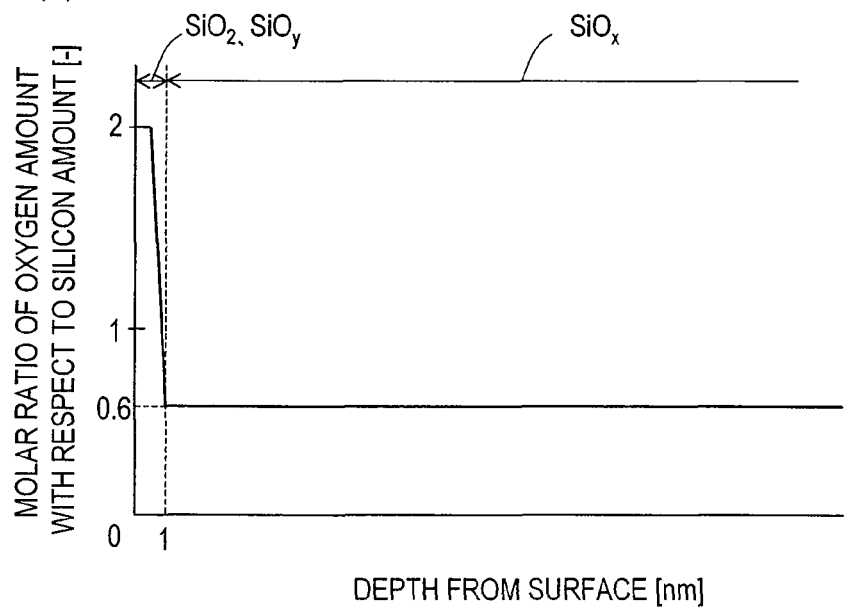

Moreover, results of measuring the $Si_{2p}$ binding energy along the depth direction of the negative-electrode active material layer by x-ray photoelectron spectroscopy are shown in FIG. 13(a).

As can be seen from FIG. 13(a), in the $Si_{2p}$ binding energy at the outermost surface, the following two were observed: a 103.5 eV peak, which is ascribable to $SiO_2$; and a broad peak near 100 eV, which is ascribable to $SiO_y$. In the $Si_{2p}$ binding energy at a depth of 1 nm, the 103.5 eV peak was very small, and the broad peak near 100 eV became predominant. At a depth of 5 nm, the 103.5 eV peak disappeared, and only the broad peak near 100 eV, which is ascribable to $SiO_x$, was observed.

Therefore, it was inferred that the $SiO_2$ layer formed on the surface of the negative-electrode active material layer had a thickness of less than 1 nm. In Comparative Example 2, the $SiO_2$ layer is very thin as mentioned above, presumably because it was formed through natural oxidation of the negative-electrode active material body. It was also found that the oxygen concentration decreases from 2 to x in the region of the negative-electrode active material layer defined by a depth down to 1 nm from the outermost surface, and it was found that the region defined by a depth of 1 nm or more was the negative-electrode active material body ($SiO_x$, x=0.6).

A relationship between oxygen concentration in the negative-electrode active material layer and depth, as inferred from these measurement results, is shown in FIG. 13(b). Note that FIG. 13(b) is a schematic diagram for facilitating understanding of the measurement results, and does not accurately describe the actual oxygen concentration.

Figure 14:
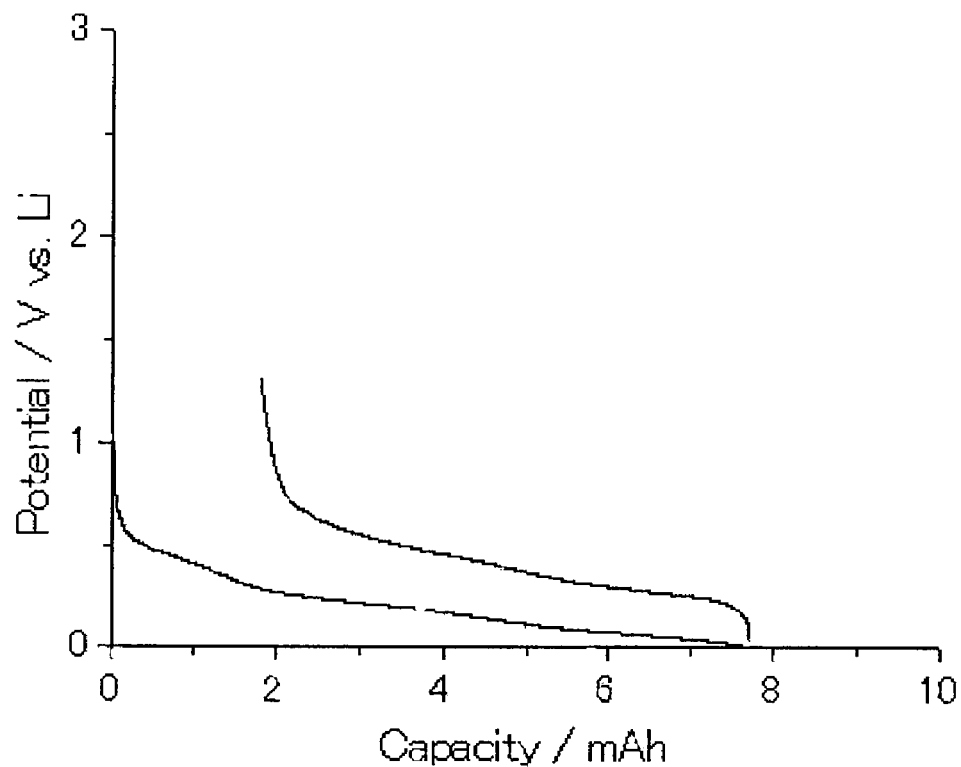
FIG. 14 A diagram showing charge-discharge characteristics of a coin battery according to Comparative Example 2.
Figure 15:
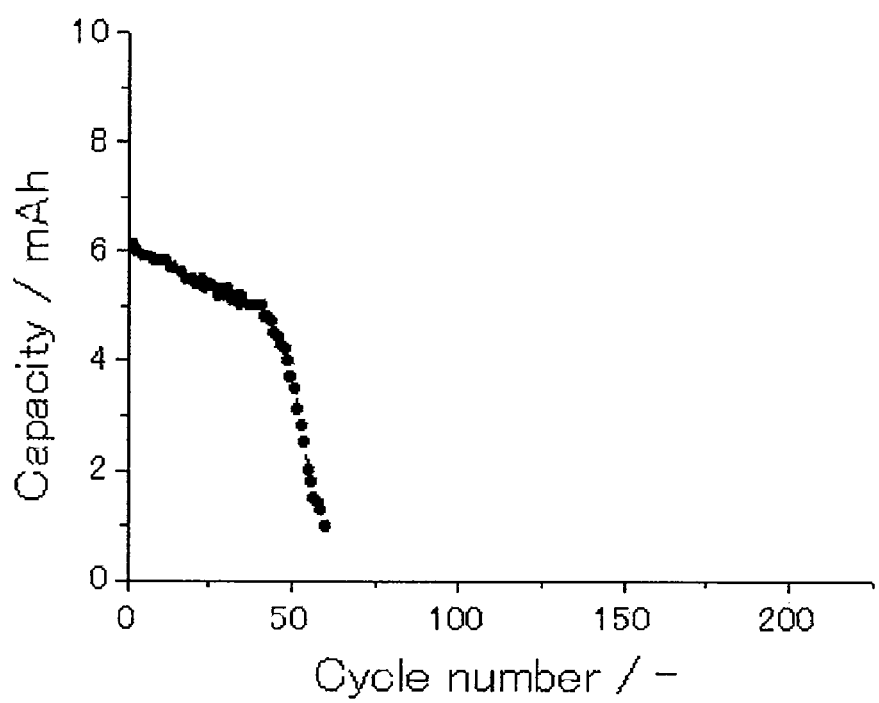
FIG. 15 A diagram showing charge-discharge cycle characteristics of the coin battery according to Comparative Example 2.

Next, results of measuring the charge-discharge capacity of the coin battery of Comparative Example 2 by the constant current charge-discharge method are shown in FIG. 14 and FIG. 15. FIG. 14 and FIG. 15 are graphs showing, respectively, the charge-discharge characteristics and the charge-discharge cycle characteristics of the coin battery of Comparative Example 2.

From the results shown in FIG. 14, it was found that the polarization is small, and that charge-discharge characteristics which are substantially equivalent to those of Example 1 are obtained. However, as can be seen from the charge-discharge cycle characteristics shown in FIG. 15, although relatively good cycle characteristics are initially obtained, polarization is promoted after around 40 cycles, after which the discharge capacity begins to rapidly decrease.

In Comparative Example 2, the $SiO_2$ layer covering the negative-electrode active material body is a natural occurrence, which is very thin and has a multitude of pinholes. Therefore, the decomposition reaction of the electrolytic solution caused by the negative-electrode active material body cannot be adequately suppressed, so that a coating formed on the negative electrode surface. As a result of this, presumably, polarization increased and a deterioration in the cycle characteristics as shown in FIG. 14 occurred.

In Examples 1 and 2 described above, the negative-electrode active material body is composed of active material particles which have grown along the normal direction of the current collector. However, the negative-electrode active material body according to the present invention may be composed of active material particles which have grown in a direction which is tilted with respect to the normal direction to the current collector. Such a negative-electrode active material body can be formed by, on the surface of a current collector, vapor-depositing silicon and oxygen from a direction which is tilted with respect to the normal direction to the current collector (oblique vapor deposition). Moreover, similarly to Examples 1 and 2, controlling the amount of oxygen and silicon supplied on the current collector surface at the time of vapor deposition will make it possible to form an expansion buffer layer and a covering layer on the surface of the negative-electrode active material body. Similarly to the aforementioned Examples, a negative-electrode active material layer thus obtained can also suppress the decomposition reaction of the electrolytic solution while ensuring a high capacity.

A negative-electrode active material layer has been formed by oblique vapor deposition, and also a coin battery having such a negative-electrode active material layer has been produced. Hereinafter, methods thereof will be described. Furthermore, evaluations were taken of the resultant negative-electrode active material layer and coin battery. The methods and results will be described.

Example 3

1. Production of Negative-Electrode Active Material Layer

Figure 16:
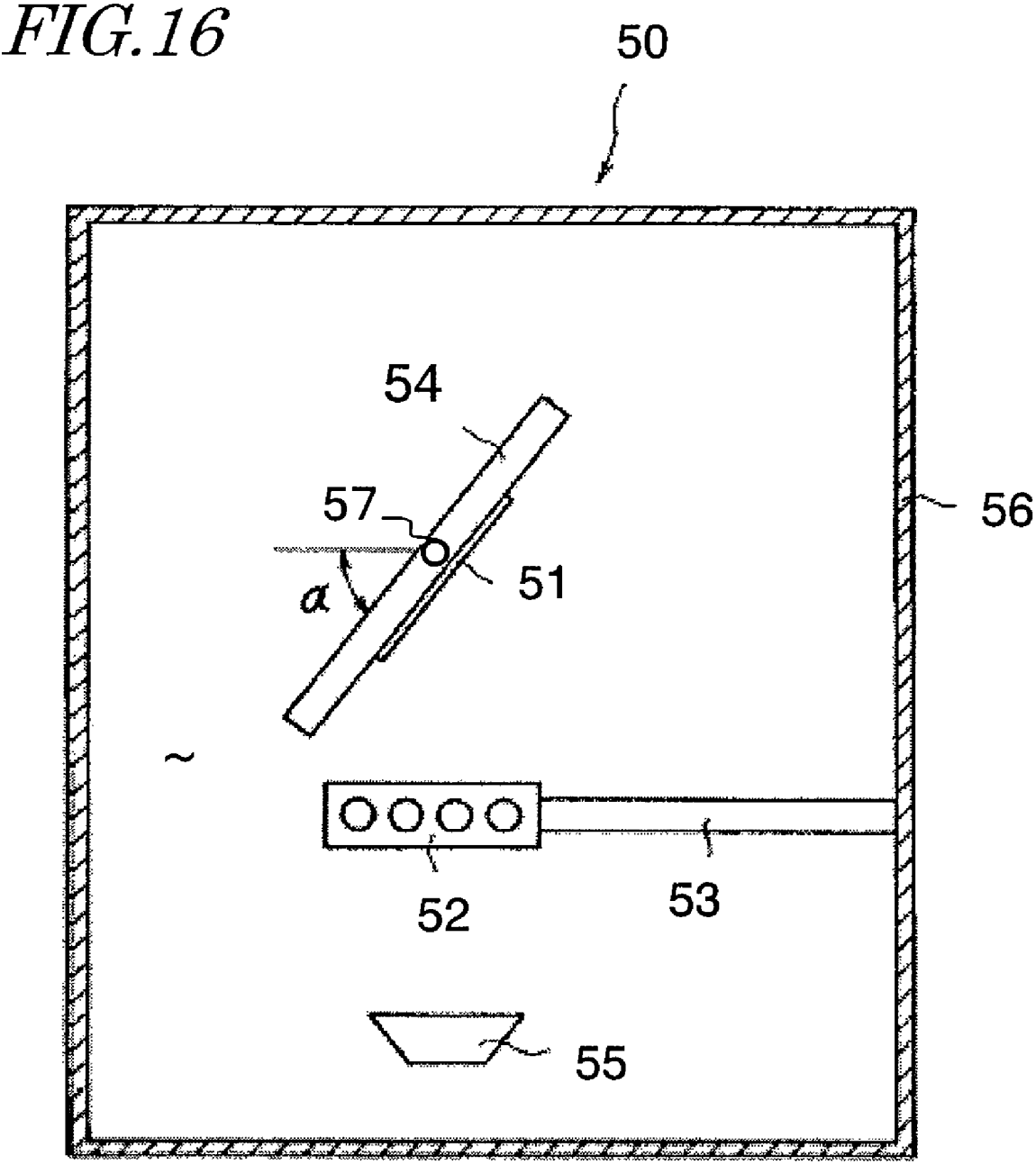
FIG. 16 A schematic cross-sectional view the construction of an example of a production apparatus for the negative electrode according to Example 3 of the present invention.

In the present Example, a negative-electrode active material layer was produced by using a vapor deposition apparatus (manufactured by ULVAC, Inc.). First, with reference to FIG. 16, the construction of the vapor deposition apparatus used in the present Example will be described.

The vapor deposition apparatus 50 includes a chamber 56 and an evacuation pump (not shown) for evacuating the chamber 56. Inside the chamber 56 are a stage 54 on which to fix a current collector 51, tubing 53 for introducing an oxygen gas into the chamber 56, a nozzle 52 which is connected to the tubing 53 for emitting the oxygen gas, and an evaporation source 55 for supplying silicon onto the surface of the current collector 51. Although not shown, an electron beam heating means for evaporating the material of the evaporation source 55 is also comprised. The tubing 53 is connected to an oxygen cylinder via a mass flow controller. The nozzle 52 is positioned so that an oxygen gas emitted from the nozzle 52 is supplied onto the surface of the current collector 51. The evaporation source 55 is disposed vertically below the stage 54. In the present Example, simple silicon with 99.9999% purity was used as the evaporation source 55. The stage 54 has a pivot axis 57, such that an angle α of the stage 54 with respect to the horizontal plane can be adjusted by rotating the stage 54 around the pivot axis 57. As used herein, the "horizontal plane" refers to a plane which is perpendicular to the direction in which the material of the evaporation source 55 travels toward the stage 54 in vaporized form. Therefore, the angle α is equal to an angle between the incident direction of the material of the evaporation source 55 with respect to the surface of the current collector 51 fixed on the stage 54 and the normal direction of the current collector 51. By adjusting this, the growth direction to the active material particles to be formed on the surface of the current collector 51 can be controlled.

Next, a production method for the negative-electrode active material layer according to the present Example will be described.

In the present Example, as the current collector 51, a copper foil having a plurality of columnar protrusions formed on its surface (40 mm×40 mm, thickness: 18 μm) was used. The upper face of each protrusion had a diamond shape (diagonal length: 10 μm×20 μm). The protrusions had a height of about 5 μm. These protrusions were arrayed in a houndstooth check pattern so that the shortest distance between the centers of adjoining protrusions was 10 μm as seen from the normal direction to the surface of the current collector 51.

Formation of the current collector 51 was performed by the following method. First, by using a resist, a mask having a plurality of diamond-shape apertures was formed on the surface of a copper foil. Next, protrusions were formed in the apertures by electroplating technique, and thereafter the mask was removed. The copper foil having the protrusions formed thereon in this manner was cut into the aforementioned size, thus obtaining the current collector 51.

The aforementioned current collector 51 was fixed on the stage 54 of the vapor deposition apparatus 50, and the stage 54 was tilted so as to constitute an angle of 60° with the horizontal plane ($\alpha$=60°) as shown. In this state, 15 minutes of vapor deposition was performed (first vapor deposition step). At this time, an acceleration voltage of the electron beam with which the simple silicon evaporation source 55 was irradiated was set to −9 kV, and the emission was set to 400 mA. Together with the oxygen which was introduced into the chamber 56 (oxygen gas flow rate: 70 sccm), the vapor of simple silicon was supplied onto the surface of the current collector 51 placed on the stage 54, whereby a compound containing silicon and oxygen ($SiO_x$) was deposited on the current collector 51.

Then, the stage 54 was rotated clockwise around the center axis 57, and was tilted with respect to the horizontal plane so as to constitute an angle of 60° in the opposite direction of the tilting direction of the stage 54 in the aforementioned first vapor deposition step (a=−60°). In this state, 15 minutes of vapor deposition was performed under conditions similar to those in the first vapor deposition step (second vapor deposition step).

Thereafter, the tilting angle of the stage 54 was again set to the same angle as that in the first vapor deposition step ($\alpha$=60°), and a similar vapor deposition was performed (third vapor deposition step). In this manner, while alternately switching the tilting angle $\alpha$ of the stage 54 between 60° and −60°, vapor deposition was performed up to a seventh step, whereby the negative-electrode active material body was obtained.

Next, with the tilting angle of the stage 54 in the seventh step ($\alpha$=60°) being maintained, the oxygen gas flow rate was increased from 70 sccm to 80 sccm while continuing vapor deposition, and 30 seconds of vapor deposition was further performed. As a result, an expansion buffer layer and a covering layer were formed on the negative-electrode active material body. In this manner, the negative-electrode active material layer of Example 3 was obtained.

2. Structure of Negative-Electrode Active Material Layer

Figure 17:
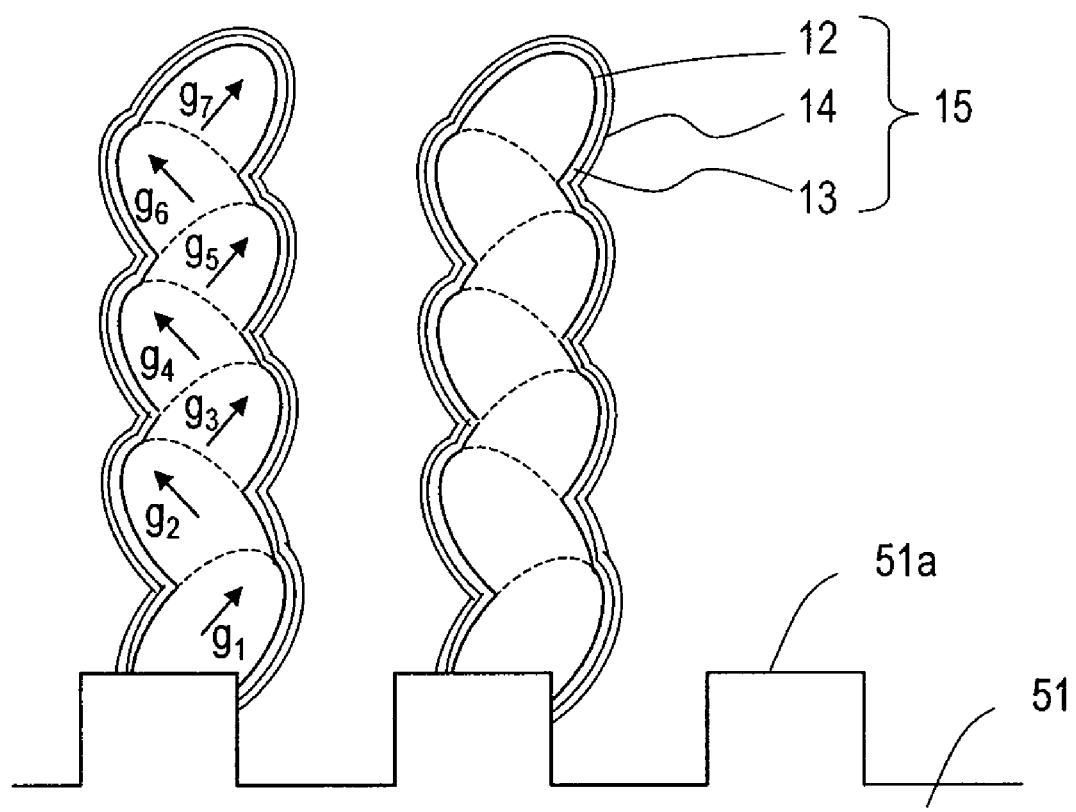
FIG. 17 A schematic cross-sectional view for describing the structure of a negative-electrode active material layer according to Example 3 of the present invention.

FIG. 17 is a schematic cross-sectional view for illustrating the structure of the negative-electrode active material layer according to Example 3 obtained by the above-described method.

As shown, the negative-electrode active material layer 15 includes: a negative-electrode active material body 12 composed of active material particles which are formed on the current collector 51; a covering layer 14 covering the surface of each active material particle; and an expansion buffer layer 13 which is formed between the negative-electrode active material body 12 and the covering layer 14.

Each active material particle of the negative-electrode active material body 12 is formed on the upper face of a columnar protrusion 51a which is provided on the surface of the current collector 51, and has a plurality of portions with different growth directions. Specifically, there are seven portions, from a first portion which was formed in the first vapor deposition step (growth direction: g1) to a seventh portion which was formed in the seventh vapor deposition step (growth direction: g7). The growth directions g1, g3, g5 and g7 of the first, third, fifth and seventh portions are generally parallel to one another, and the growth directions g2, g4 and g6 of the second, fourth and sixth portions are generally parallel to one another.

Furthermore, since the negative-electrode active material body 12 of the present Example is formed by oblique vapor deposition, in a cross section of the negative-electrode active material body (active material particles) 12 which is parallel to the surface of the current collector 51, silicon and oxygen concentrations may have a distribution rather than being uniform, because of the directions of vapor deposition.

Note that FIG. 17 is a schematic diagram. Although the expansion buffer layer 13 and the covering layer 14 are illustrated as covering the entire surface of each active material particle, they only need to cover at least a portion of the surface of the active material particle. For example, they may be formed on the surface of the seventh portion, which is most likely to come in contact with the electrolytic solution. Furthermore, FIG. 17 schematically illustrates the expansion buffer layer 13 and covering layer 14 as having generally uniform thicknesses. However, these layers 13 and 14 are layers obtained by growing silicon oxide in a direction which is similar to the growth direction g7 of the seventh portion of each active material particle, and therefore, these layers 13 and 14 will be thicker on the apex of the seventh portion of the active material particle than on the side face of the active material particle.

3. Measurement Results of Oxygen Concentration in Negative-Electrode Active Material Layer In the negative-electrode active material body of Example 3, as described above, silicon and oxygen have non-uniform distributions in cross sections which are parallel to the surface of the current collector 51, and thus it is difficult to determine the mole fraction of oxygen by using the analysis methods (x-ray photoelectron spectroscopy or x-ray fluorescence spectrometry) conducted in Examples 1 and 2 described above. Therefore, in the present Example, a compositional analysis of the negative-electrode active material layer was performed by an energy dispersive x-ray spectroscopy using a transmission electron microscope, thus determining the oxygen concentration along the depth direction. The compositional analysis was performed according to a method described below, by using a field emission transmission electron microscope (HF-2200 manufactured by Hitachi, Ltd.).

First, by focused ion beam technique, a sample for cross-sectional observation under a transmission electron microscope was prepared. Herein, by using gallium (Ga) ions as an ion source in a focused ion beam apparatus (Quanta 3D manufactured by FIE Company), an observational cross section was created in the negative-electrode active material body layer of Example 3, thus preparing a sample. In order to prevent the surface of the negative-electrode active material body for observation from being destroyed or abraded during the preparation of the sample, carbon (C) and platinum (Pt) were vapor-deposited in advance on the surface of the negative-electrode active material layer, as a protection film.

Next, with reference to the drawings, measurement positions of oxygen concentration in a sample for cross-sectional observation will be described.

Figure 18:
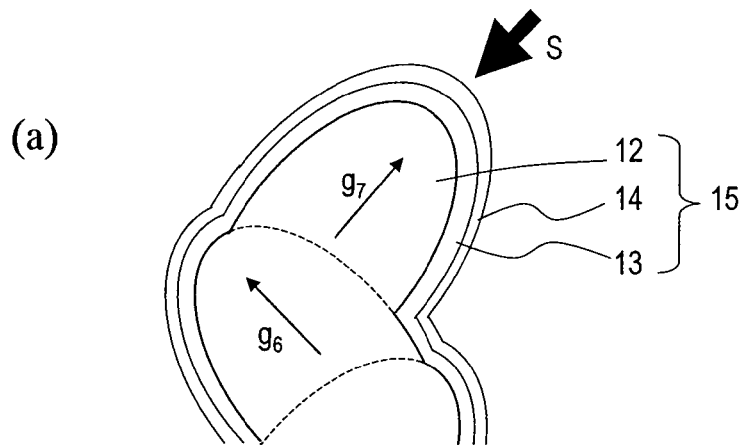
FIG. 18 (a) is a schematic cross-sectional view for explaining measurement positions in a compositional analysis for the negative-electrode active material layer according to Example 3 of the present invention; (b) is a cross-sectional observation photograph from a transmission electron microscope, showing a surface region of a negative-electrode active material layer including the aforementioned measurement positions; and (c) is an enlarged photograph of the cross-sectional observation photograph of (b).
Figure 18:
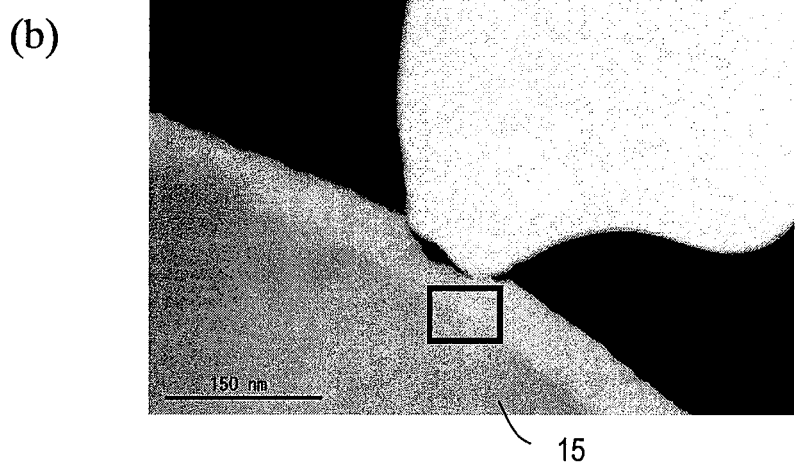
Figure 18:
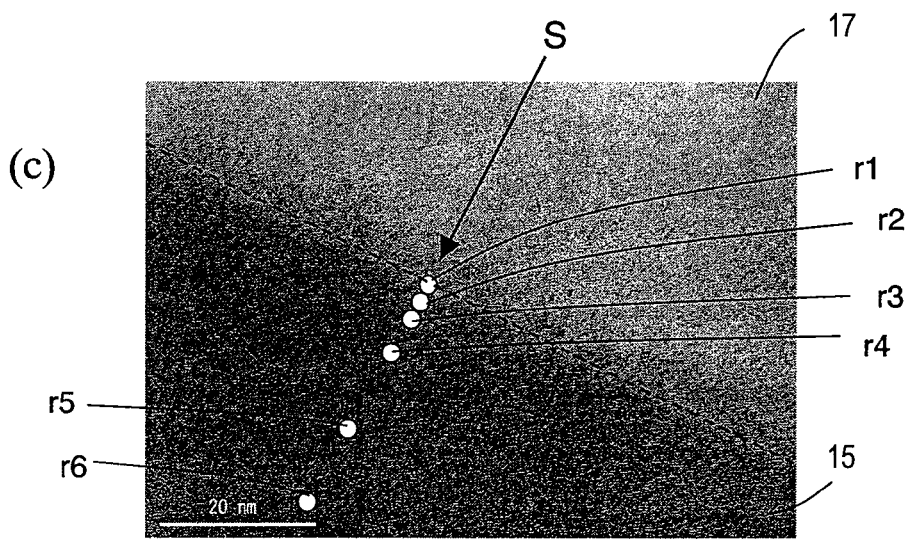

FIG. 18(a), which is a diagram for illustrating measurement positions in the compositional analysis in Example 3, is an enlarged cross-sectional view of the negative-electrode active material body layer shown in FIG. 17.

In the present Example, from near the apex of an active material particle 12, a plurality of measurement positions were selected along a direction S as shown, and the oxygen concentration at each measurement position was examined. The direction S was chosen so as to be generally parallel to the normal direction of the outermost surface of the negative-electrode active material layer 15.

FIG. 18(b) is a transmission electron micrograph showing a surface region including measurement positions of compositional analysis in the sample for cross-sectional observation. FIG. 18(c) is an enlarged photograph of the aforementioned surface region in the transmission electron microscope image of FIG. 18(b).

As shown in FIG. 18(c), a measurement position r1 was chosen at the interface between the negative-electrode active material layer 15 and the protection film 17 in the sample for cross-sectional observation, and beginning from this measurement position r1, measurement positions r2 to r6 were selected along the aforementioned direction S. The measurement positions r1 to r6 had depths of 0 nm, 2 nm, 5 nm, 10 nm, 20 nm, and 30 nm, respectively. Note that the "depth of a measurement position" as used herein means a depth from the outermost surface of the negative-electrode active material layer 15, along the aforementioned direction S.

Next, at these measurement positions r1 to r6, atomic concentrations (at %) of silicon and oxygen were measured by energy dispersive x-ray spectroscopy. In the measurements, an incident beam diameter of the transmission electron microscope was set to 1 nm, and an acceleration voltage was set to 200V. Moreover, from the atomic concentration of silicon and oxygen obtained from the measurements, a molar ratio (O(at %)/Si(at %)) of the oxygen amount to the silicon amount was calculated.

Figure 19:
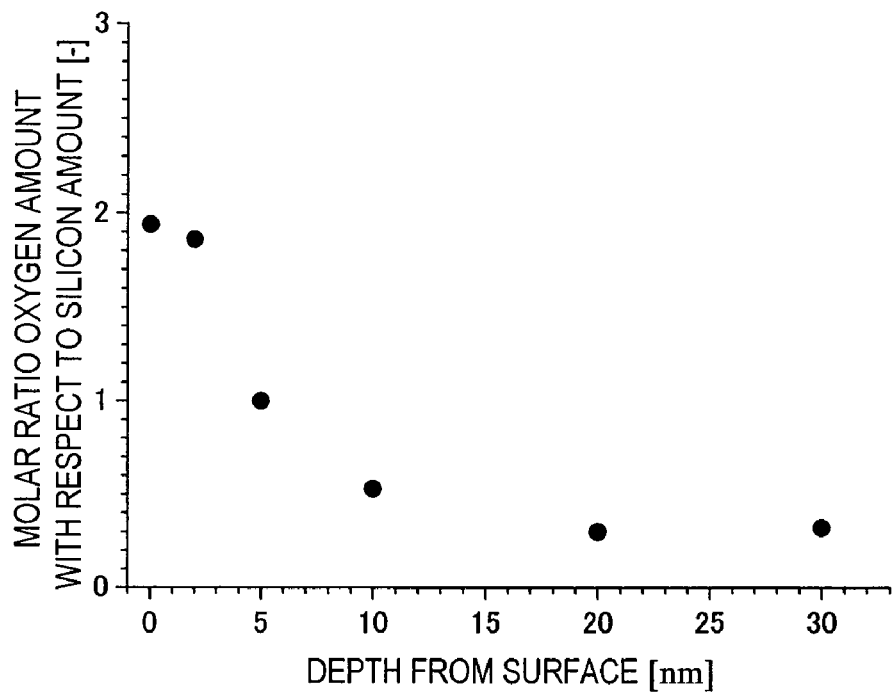
FIG. 19 A graph showing changes in oxygen concentration along the depth direction of the negative-electrode active material layer according to Example 3 of the present invention.

The measurement results are shown in Table 1 and FIG. 19. FIG. 19 is a graph in which the relationship between oxygen concentration and depth is plotted, where the vertical axis represents a molar ratio of the oxygen amount with respect to the silicon amount, and the horizontal axis represents the depth from the outermost surface of the negative-electrode active material layer.

TABLE 1

| measurement position | r1 | r2 | r3 | r4 | r5 | r6 |
|---|---|---|---|---|---|---|
| depth from negative-electrode active material layer surface (nm) | 0 | 2 | 5 | 10 | 20 | 30 |
| Si (at %) | 34 | 35 | 50 | 65 | 77 | 76 |
| O (at %) | 66 | 65 | 50 | 35 | 23 | 24 |
| O (at %)/Si (at %) | 1.94 | 1.86 | 1.00 | 0.53 | 0.30 | 0.32 |

It was found from the results shown in Table 1 and FIG. 19 that, in Example 3, the composition from the surface of the negative-electrode active material layer to about 2 nm was substantially represented as $SiO_2$. Thus, it was inferred that the covering layer had a thickness of about 2 nm. It was also found that the region of the negative-electrode active material layer defined by a depth of 20 nm or more from the surface was the negative-electrode active material body ($SiO_x$, X: about 0.3). Furthermore, in the region defined by a depth of 2 nm to about 20 nm from the surface, the molar ratio of the oxygen amount with respect to the silicon amount decreases from 2 to x, which confirms that an expansion buffer layer ($SiO_y$ layer) was formed between the covering layer and the negative-electrode active material body.

Note that, since the compositional analysis in the present Example was performed with respect to a very small region, measurement errors were taken into consideration by inferring that any molar ratio of the oxygen amount with respect to the silicon amount that was no less than 1.8 and no more than 2.1 indicated silicon dioxide ($SiO_2$).

4. Evaluation of Coin Battery

The current collector having the negative-electrode active material layer of Example 3 formed thereon was cut out in a circular shape with a diameter of 12.5 mm, thus producing a negative electrode of Example 3. By using this negative electrode, a coin battery having the structure shown in FIG. 4 was produced. The production method for the coin battery was similar to the method described above in Example 1.

Next, by a method similar to Example 1, the charge-discharge capacity of the coin battery was measured. The measurement results are shown in FIG. 20 and FIG. 21.

Figure 20:
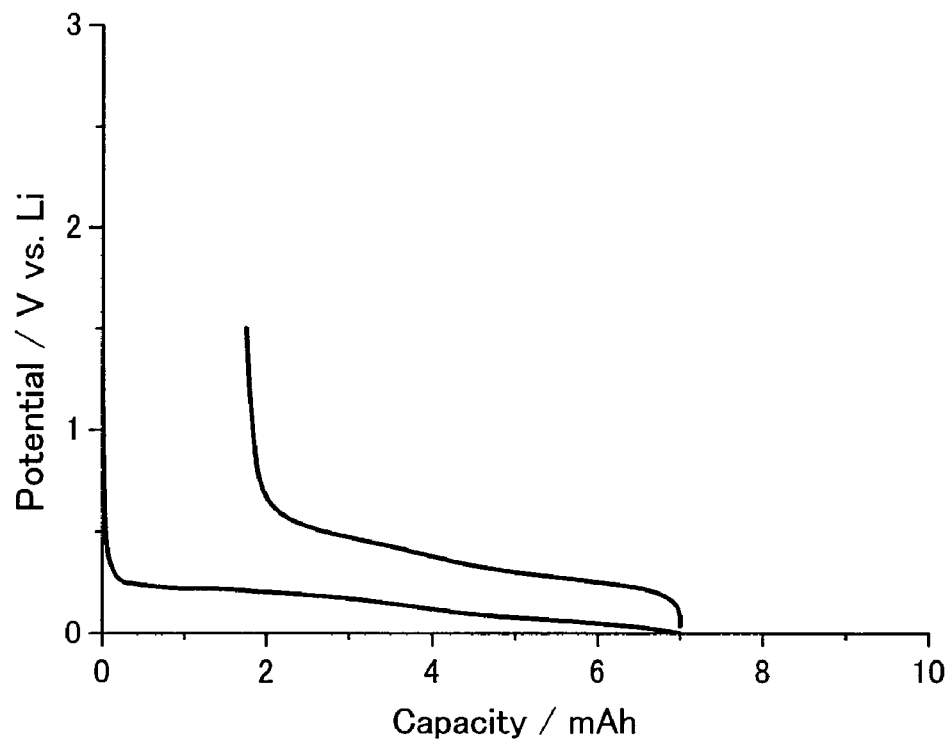
FIG. 20 A diagram showing charge-discharge characteristics of a coin battery according to Example 3 of the present invention.

FIG. 20 is a graph showing the charge-discharge characteristics of the coin battery of Example 3, where the vertical axis represents potential (V) relative to metal lithium, and the horizontal axis represents capacity (mAh) The lower curve is a charge curve, and the upper curve is a discharge curve. FIG. 21 is a graph showing the charge-discharge cycle characteristics of the coin battery of Example 3, where the vertical axis represents capacity (mAh), and the horizontal axis represents a number of cycles (times).

From the results shown in FIG. 20, the charge capacity is 7 mAh; the discharge capacity is 5.2 mAh; the irreversible capacity is 1.8 mAh; and in the range where the capacity is 2 to 7 mAh, the potential difference between the charge curve and the discharge curve is small. Thus, excellent polarization characteristics and excellent high charge-discharge characteristics were confirmed.

Figure 21:
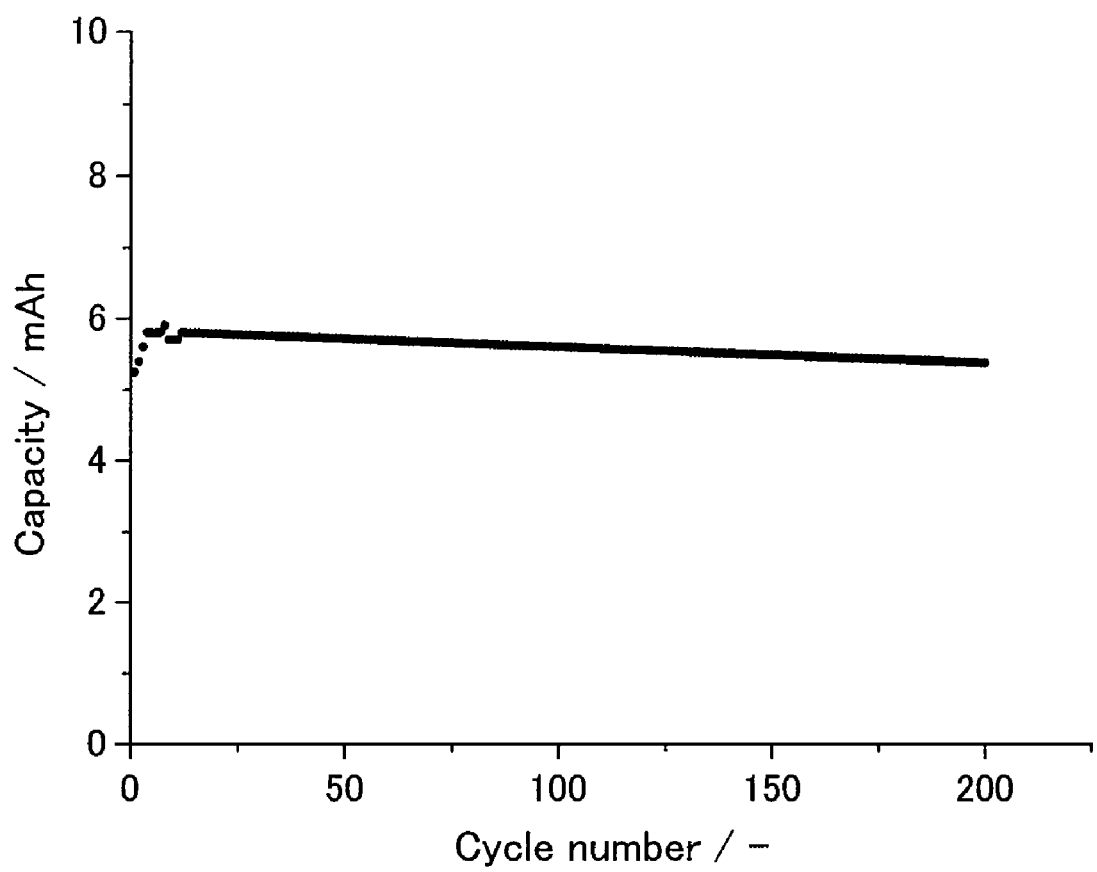
FIG. 21 A diagram showing charge-discharge cycle characteristics of the coin battery according to Example 3 of the present invention.

It was also found from the results shown in FIG. 21 that the capacity of the coin battery of Example 3 was initially as high as about 5.2 mAh, gradually increased till about 10 cycles, until reaching about 6 mAh (maximum capacity). Furthermore, even after 200 cycles, about 5.4 mAh was maintained, i.e., 90% of the maximum capacity. Thus, it was confirmed that the coin battery of Example 3 has excellent charge-discharge cycle characteristics.

In Example 3, a current collector having columnar protrusions formed on its surface was used. When such protrusions are formed on the surface of the current collector, the arrangement of active material particles can be controlled, thus providing an effect of ensuring a sufficient interval between adjoining active material particles and alleviating the stress which is applied to the current collector surface due to expansion of the active material particles. The shape, size, arraying pitch, and the like of the protrusions are not particularly limited, and are to be selected as appropriate.

Moreover, although the negative-electrode active material body is formed by oblique vapor deposition in Example 3, the method and conditions of this formation are not limited to the method which is described in Example 3. The incident direction (angle α) of silicon atoms with respect to the normal direction to the current collector is to be selected as appropriate. Although a plurality of vapor depositions are performed while varying the angle α in Example 3, active material particles may also be formed so as to grow only in one direction while keeping a constant angle α. Alternatively, the angle α may be gradually varied during vapor deposition.

Furthermore, in each of Examples 1 to 3 above, formation of the negative-electrode active material layer was carried out while the current collector was placed on a stage in a vacuum chamber. Alternatively, a long sheet-like current collector may be allowed to travel within a vacuum chamber, and a negative-electrode active material layer may be formed on the traveling current collector upon a roller or belt (endless belt). In this case, a region in which to form the negative-electrode active material body and a region having an oxygen concentration which is higher than in the former region (i.e., a region in which to form the covering layer) may be provided within the same vacuum chamber and along the same roller or belt. Alternatively, a sheet-like current collector may be allowed to travel, and only the negative-electrode active material body may be formed thereon and then wound up, and thereafter the current collector having the negative-electrode active material body formed thereon may again be allowed to travel, thus forming a covering layer upon a roller or belt.

INDUSTRIAL APPLICABILITY

The negative electrode for a lithium secondary battery according to the present invention is applicable to various lithium secondary batteries, e.g., coin-, cylindrical-, flat-, or prismatic-type. While ensuring a high charge-discharge capacity, these lithium secondary batteries have better charge-discharge cycle characteristics than conventionally, and therefore can be broadly used in: mobile information terminals such as PCs, mobile phones, and PDAs; audiovisual devices such as videorecorders, memory audio players; and so on.

The invention claimed is:

1. A negative electrode for a lithium secondary battery comprising:
    a current collector;
    a negative-electrode active material body supported by the current collector, the negative-electrode active material body having a chemical composition represented as $SiO_x$ ($0.1 \leq x \leq 1.2$)
    a covering layer formed on the negative-electrode active material body, the covering layer being composed of silicon dioxide; and
    an expansion buffer layer formed between the negative-electrode active material body and the covering layer, the expansion buffer layer having a chemical composition represented as $SiO_y$ ($x<y<2$),
    wherein the covering layer has a thickness which is greater than 1 nm and no more than 10 nm.

2. The negative electrode for a lithium secondary battery of claim 1, wherein an oxygen concentration along a depth direction of the expansion buffer layer increases from the negative-electrode active material body toward the covering layer.

3. The negative electrode for a lithium secondary battery of claim 2, wherein a molar ratio of an oxygen amount with respect to a silicon amount along the depth direction of the expansion buffer layer is the aforementioned x at an interface between the expansion buffer layer and the negative-electrode active material body, and 2 at an interface between the expansion buffer layer and the covering layer.

4. The negative electrode for a lithium secondary battery of claim 1, wherein the negative-electrode active material body comprises a plurality of active material particles formed on the current collector.

5. The negative electrode for a lithium secondary battery of claim 4, wherein the active material particles grow along a generally normal direction to the current collector.

6. The negative electrode for a lithium secondary battery of claim 4, wherein a growth direction of the active material particles is tilted with respect to the normal direction to the current collector.

7. The negative electrode for a lithium secondary battery of claim 6, wherein the active material particles have a plurality of portions with different growth directions, each growth direction being tilted with respect to the normal direction to the current collector.

8. The negative electrode for a lithium secondary battery of claim 6, wherein,
    the current collector has a plurality of bumps on a surface thereof; and
    each of the plurality of active material particles is formed on a corresponding bump.

9. A lithium-ion secondary battery comprising:
    a positive electrode capable of occluding and releasing lithium ions;
    the negative electrode for a lithium secondary battery of claim 1;
    a separator disposed between the positive electrode and the negative electrode for a lithium secondary battery; and
    an electrolyte having lithium-ion conductivity.

10. A method of producing a negative electrode for a lithium-ion secondary battery, comprising:
    (A) a step of providing a current collector;
    (B) a step of forming a negative-electrode active material body on the current collector by supplying oxygen and silicon onto a surface of the current collector, said negative-electrode active material body having a chemical composition represented as $SiO_x$ ($0.1 \leq x \leq 1.2$); and
    (C) a step of forming, on the negative-electrode active material body, a layer having a higher mole fraction of oxygen than does the negative-electrode active material body, step (C) including:
        a step of forming a covering layer composed of silicon dioxide, said covering layer having a thickness which is greater than 1 nm and no more than 10 nm; and
        a step of forming an expansion buffer layer between the negative-electrode active material body and the covering layer, the expansion buffer layer having a chemical composition represented as $SiO_y$ ($x<y<2$).

* * * * *